US012032317B2

(12) United States Patent
Matsui et al.

(10) Patent No.: US 12,032,317 B2
(45) Date of Patent: Jul. 9, 2024

(54) IMAGE FORMING APPARATUS INCLUDING POSITIONING OF SUCTION BELT CONVEYANCE UNIT

(71) Applicant: CANON KABUSHIKI KAISHA, Tokyo (JP)

(72) Inventors: Sho Matsui, Chiba (JP); Mikihiko Watanabe, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 23 days.

(21) Appl. No.: 18/153,083

(22) Filed: Jan. 11, 2023

(65) Prior Publication Data

US 2023/0229105 A1 Jul. 20, 2023

(30) Foreign Application Priority Data

Jan. 20, 2022 (JP) ................................ 2022-006822

(51) Int. Cl.
*G03G 15/00* (2006.01)
*B65H 5/02* (2006.01)

(52) U.S. Cl.
CPC ......... *G03G 15/6529* (2013.01); *B65H 5/021* (2013.01); *B65H 2406/32* (2013.01)

(58) Field of Classification Search
USPC .......................................................... 399/400
See application file for complete search history.

(56) References Cited

U.S. PATENT DOCUMENTS

2006/0284960 A1* 12/2006 Kishi .................. G03G 21/206 347/140
2010/0061741 A1* 3/2010 Minbu ................ G03G 15/657 399/21

FOREIGN PATENT DOCUMENTS

JP 2012083416 A 4/2012

* cited by examiner

*Primary Examiner* — Leslie J Evanisko
(74) *Attorney, Agent, or Firm* — ROSSI, KIMMS & McDOWELL LLP

(57) ABSTRACT

An image forming apparatus includes a transfer unit including a transfer nip portion, a fixing unit including a fixing nip portion, a suction belt conveyance unit arranged between the transfer unit and the fixing unit and conveying the sheet toward the fixing nip, a first casing, a second casing connected to the first casing and supporting the fixing unit, a first positioning portion, and, a second positioning portion. The first positioning portion is disposed in the first casing and performs positioning of the suction belt conveyance unit in a predetermined direction along a surface perpendicular to a width direction of the sheet. The second positioning portion is disposed in the second casing and performs positioning of the suction belt conveyance unit in the predetermined direction.

11 Claims, 12 Drawing Sheets

IMAGE FORMING APPARATUS INCLUDING POSITIONING OF SUCTION BELT CONVEYANCE UNIT

BACKGROUND OF THE INVENTION

Field of the Invention

The present invention relates to image forming apparatuses such as copying machines, printers, facsimiles, and multifunction devices equipped with such functions.

Description of the Related Art

Hitherto, in image forming apparatuses, there has been known a configuration in which a toner image is transferred to a sheet at a transfer unit, and the toner image transferred to the sheet at the transfer unit is fixed to the sheet at a fixing unit. Further, there has also been known a configuration in which a conveyance portion for conveying sheets is provided between the transfer unit and the fixing unit in a sheet conveyance direction (refer for example to Japanese Patent Application Laid-Open Publication No. 2012-83416).

Along with the increase in speed of the image forming apparatus, the size of the apparatus is also increasing, and a configuration in which a conveyance unit and a fixing unit are supported on different casings is provided, wherein the casings are connected together for use. As described, in a configuration where two casings are connected together, tolerance related to the position of the conveyance unit and the position of the fixing unit becomes great, since a large number of components exist between the conveyance unit and the fixing unit supported on different casings. Therefore, the positional relationship between the conveyance unit and the fixing unit are deviated from the appropriate position, such that conveyance failure of the sheets may occur when conveying sheets from the conveyance unit to the fixing unit.

SUMMARY OF THE INVENTION

The present invention provides a configuration in which the conveyance unit and the fixing unit are supported on different casings and the casings are connected together, wherein occurrence of conveyance failure of sheets is suppressed.

According to one aspect of the present invention, an image forming apparatus includes a transfer unit including a transfer nip portion configured to nip and convey a sheet, the transfer unit configured to transfer a toner image to the sheet, a fixing unit including a fixing nip portion configured to nip and convey the sheet, the fixing unit configured to fix the toner image transferred to the sheet by the transfer unit to the sheet, a suction belt conveyance unit arranged between the transfer unit and the fixing unit in a sheet conveyance direction, the suction belt conveyance unit including a belt portion, and a suction portion configured to suck the sheet to the belt portion by sucking air, the suction belt conveyance unit configured to convey the sheet sucked to the belt portion toward the fixing nip portion by rotating the belt portion, a first casing, a second casing connected to the first casing and configured to support the fixing unit, a first positioning portion disposed in the first casing and configured to perform positioning of the suction belt conveyance unit in a predetermined direction along a surface perpendicular to a width direction of the sheet orthogonal to the sheet conveyance direction, and, a second positioning portion disposed in the second casing and configured to perform positioning of the suction belt conveyance unit in the predetermined direction.

Further features of the present invention will become apparent from the following description of exemplary embodiments with reference to the attached drawings.

DESCRIPTION OF THE EMBODIMENTS

First Embodiment

A first embodiment will be described with reference to FIGS. 1 to 8. At first, a general configuration of an image forming apparatus, or image forming system, according to the present embodiment will be described with reference to FIG. 1.

Image Forming Apparatus

Figure 1:
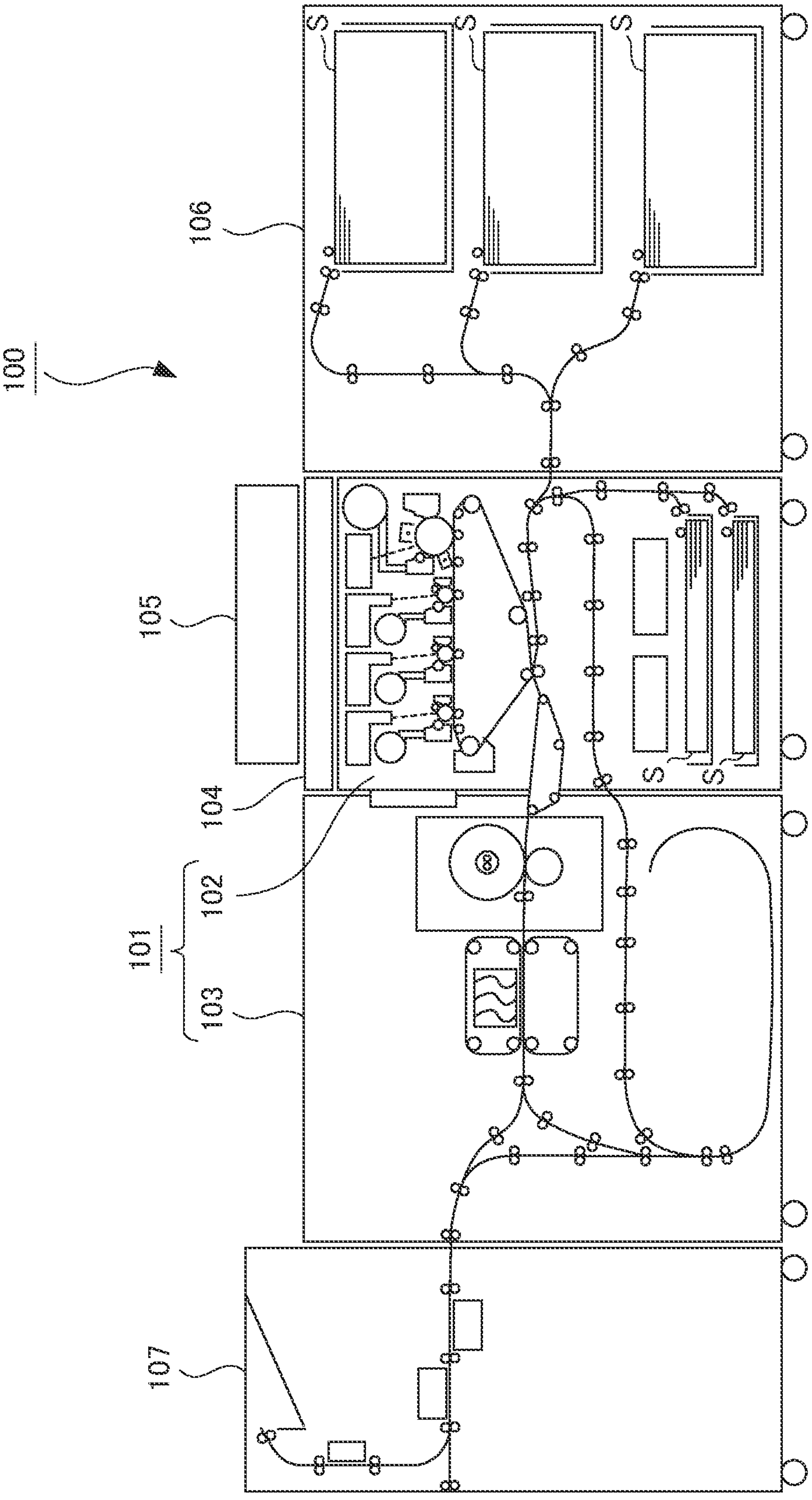
FIG. 1 is a schematic cross-sectional view of an image forming apparatus according to a first embodiment.

FIG. 1 is a schematic cross-sectional view of an image forming apparatus 100 including an image forming apparatus body 101 according to the present embodiment. The image forming apparatus body 101 is composed of an image forming unit 102 for transferring a toner image to a sheet S being fed, and a fixing and conveying unit 103 for fixing the transferred toner image to the sheet S. The image forming unit 102 and the fixing and conveying unit 103 are respectively composed of independent casings. According to this configuration, even in the case of a large-scale apparatus, packing and shipping can be performed to each casing in the separated state, such that the workability related to logistics leading to installation of the apparatus can be improved.

A document reading apparatus 104 for reading document images and a document feeder 105 for feeding a plurality of documents in a stacked state one by one to the document reading apparatus 104 are selectively connected to an upper portion of the image forming unit 102.

A sheet feeding apparatus selected from a large-capacity sheet feeding apparatus 106 having storage portions for storing a plurality of sheets S, a manual sheet feeder not shown, and a long sheet feeder capable of storing long sheets S can be connected to an upstream side of the image forming unit 102 in a conveyance direction of the sheet S (hereinafter referred to as a sheet conveyance direction). A sheet feeding apparatus not shown selected from a large-capacity sheet feeding apparatus, a manual sheet feeder, and a long sheet feeder can be connected further upstream of the large-capacity sheet feeding apparatus 106.

A sensing apparatus 107 for reading a toner image that has been fixed to one side or both sides of the sheet S, detecting image density or deviation of image position, and performing feedback correction of image signals being transmitted to the image forming unit 102 is selectively connected to a downstream side of the fixing and conveying unit 103 in the sheet conveyance direction. One or a combination of various sheet processing apparatuses not shown including an inserter, a puncher, a case binding device, a large-capacity stacker, a folder, a finisher, and a trimmer can be selectively connected to a downstream side of the fixing and conveying unit 103 or the sensing apparatus 107.

As described above, the image forming apparatus body 101 according to the present embodiment is capable of having a variety of optional devices selectively connected thereto to enable products applied to various postprocessing treatments for various materials to be output in-line, such that an image forming apparatus, or image forming system, 100 having superior productivity, image quality, stability and functions can be provided.

Image Forming Unit

Figure 2:
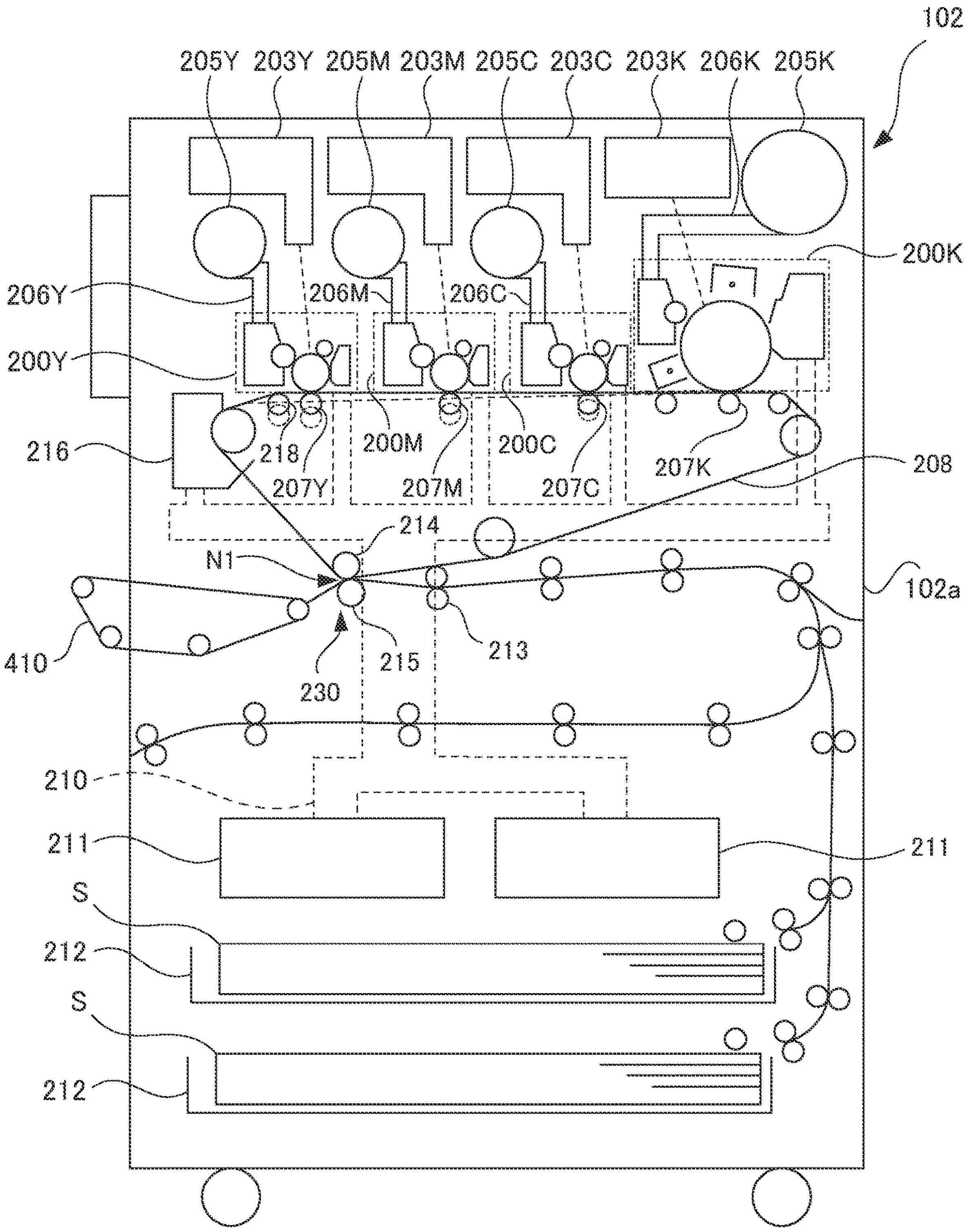
FIG. 2 is a schematic cross-sectional view of an image forming unit according to the first embodiment.
Figure 3B:
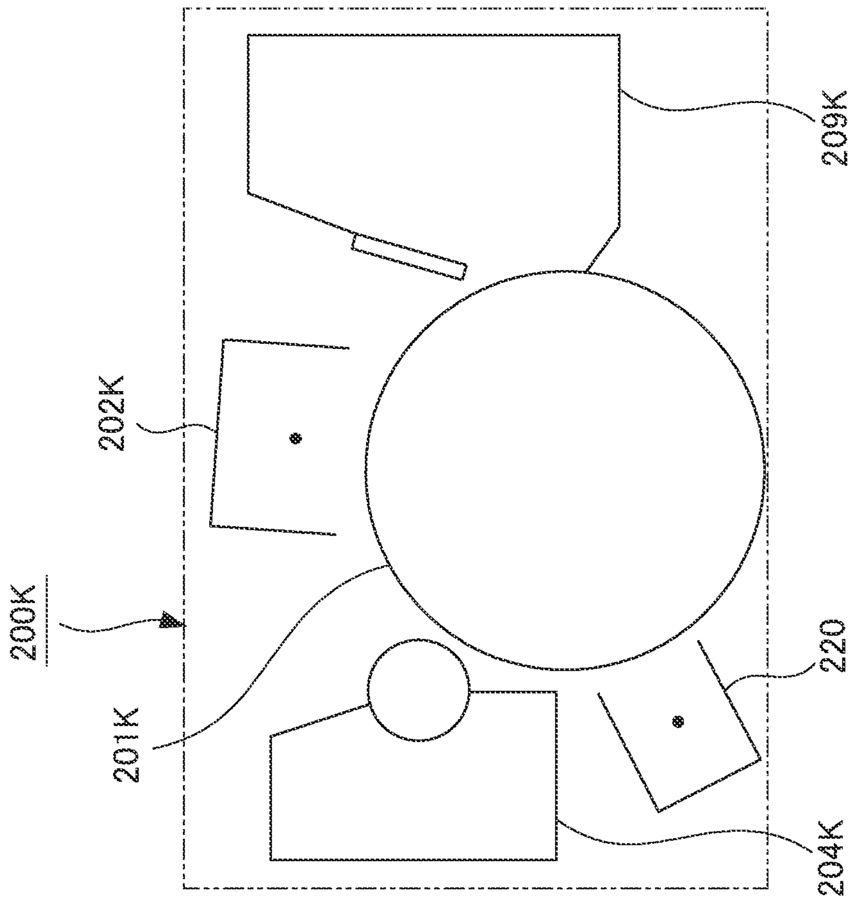
FIG. 3B is a schematic cross-sectional view of an image forming station of a black image according to the first embodiment.
Figure 3A:
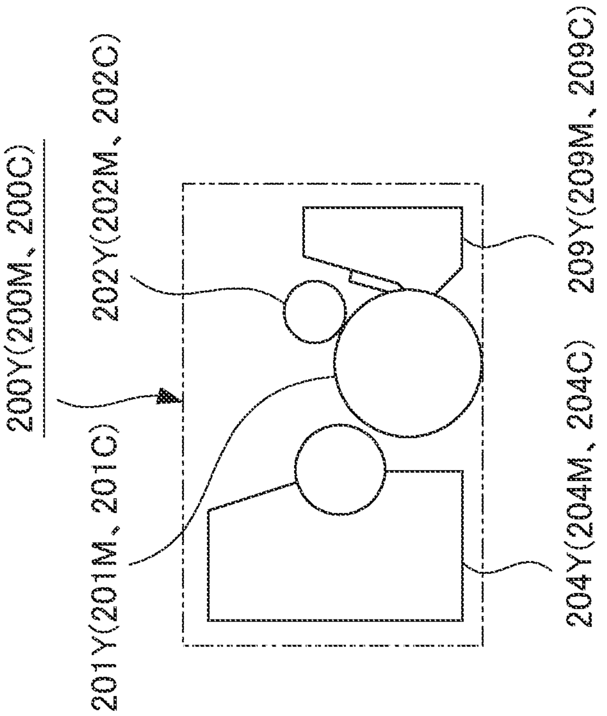
FIG. 3A is a schematic cross-sectional view of an image forming station of a colored image according to the first embodiment.

Next, a general configuration of the image forming unit 102 will be described with reference to FIGS. 2, 3A and 3B. FIG. 2 is a schematic cross-sectional view of the image forming unit 102 in the image forming apparatus body 101. FIG. 3A is a schematic cross-sectional view illustrating image forming stations 200Y, 200M, and 200C for forming colored images of yellow (Y), magenta (M), and cyan (C), and FIG. 3B is a schematic cross-sectional view illustrating an image forming station 200K for forming a black (K) image. FIG. 3A illustrates the image forming station 200Y for forming a yellow image as a representative example.

As illustrated in FIG. 2, the image forming unit 102 includes a plurality of image forming stations 200Y, 200M, 200C, and 200K for forming different colored images of yellow (Y), magenta (M), cyan (C), and black (K). Since the basic configurations of the image forming stations of respective colored images are the same, the image forming station 200Y for forming a yellow image is described as a representative example of the image forming stations of colored images. Further, only the size of the photosensitive drum mainly differs between the image forming stations of colored images and the image forming station of the black image, and their basic configurations for forming images are the same.

Photosensitive drums 201Y and 201K serving as an image bearing member and a photosensitive member have their surfaces uniformly charged by primary chargers 202Y and 202K, and thereafter, electrostatic latent images are formed thereto by laser scanners 203Y and 203K which are driven based on image information signals being transmitted thereto. In the present embodiment, the primary charger 202Y for colored images is a charging roller that is arranged in contact with or close to the photosensitive drum 201Y, and the primary charger 202K for the black image is a corona charger, but the primary charger can be either the charging roller or the corona charger.

Latent images formed on the photosensitive drums 201Y and 201K are developed as toner images by developing units 204Y and 204K. Toner consumed by developing images is replenished as required from toner bottles 205Y and 205K through toner replenishment paths 206Y and 206K to the respective developing units 204Y and 204K. Predetermined pressing forces and electrostatic load biases are applied to toner images on the photosensitive drums 201Y and 201K from primary transfer rollers 207Y and 207K, by which the toner images are sequentially transferred to an intermediate transfer belt 208. After transfer, the small amount of residual toner remaining on the photosensitive drums 201Y and 201K is removed by photosensitive drum cleaners 209Y and 209K to prepare for a subsequent image formation. The residual toner being removed is passed through a toner collecting path 210 and stored in a collected toner container 211.

Meanwhile, skew correction of the sheets S fed one by one from a storage portion 212 of the sheets S within the image forming unit 102 or one of the sheet feeding apparatuses connected to an exterior portion described above is performed by aligning a leading edge of the sheet to a nip portion of a registration roller 213 and forming a loop. Thereafter, the registration roller 213 conveys the sheet S to a secondary transfer unit 230 at a timing synchronized with the toner image on the intermediate transfer belt 208. A secondary transfer outer roller 215 is in pressure contact with the intermediate transfer belt 208 supported from an inner side of an intermediate transfer belt 208 by a secondary transfer inner roller 214 and forms a secondary transfer nip portion N1 with the intermediate transfer belt 208.

The toner image on the intermediate transfer belt 208 is transferred to the sheet S by applying a predetermined pressing force and an electrostatic load bias at the secondary transfer nip portion N1. The secondary transfer inner roller 214, the intermediate transfer belt 208, and the secondary transfer outer roller 215 constitute the secondary transfer unit 230 serving as a transfer unit according to the present embodiment. After transfer, the small amount of residual toner remaining on the intermediate transfer belt 208 is removed by an intermediate transfer belt cleaner 216 to prepare for the subsequent image formation. The residual toner being removed is passed through the toner collecting path 210 and stored in the collected toner container 211. The sheet S having the toner image transferred thereto is conveyed by a pre-fixing conveyance unit 410 serving as a conveyance unit to the fixing and conveying unit 103 arranged downstream thereof.

Fixing and Conveying Unit

Figure 4:
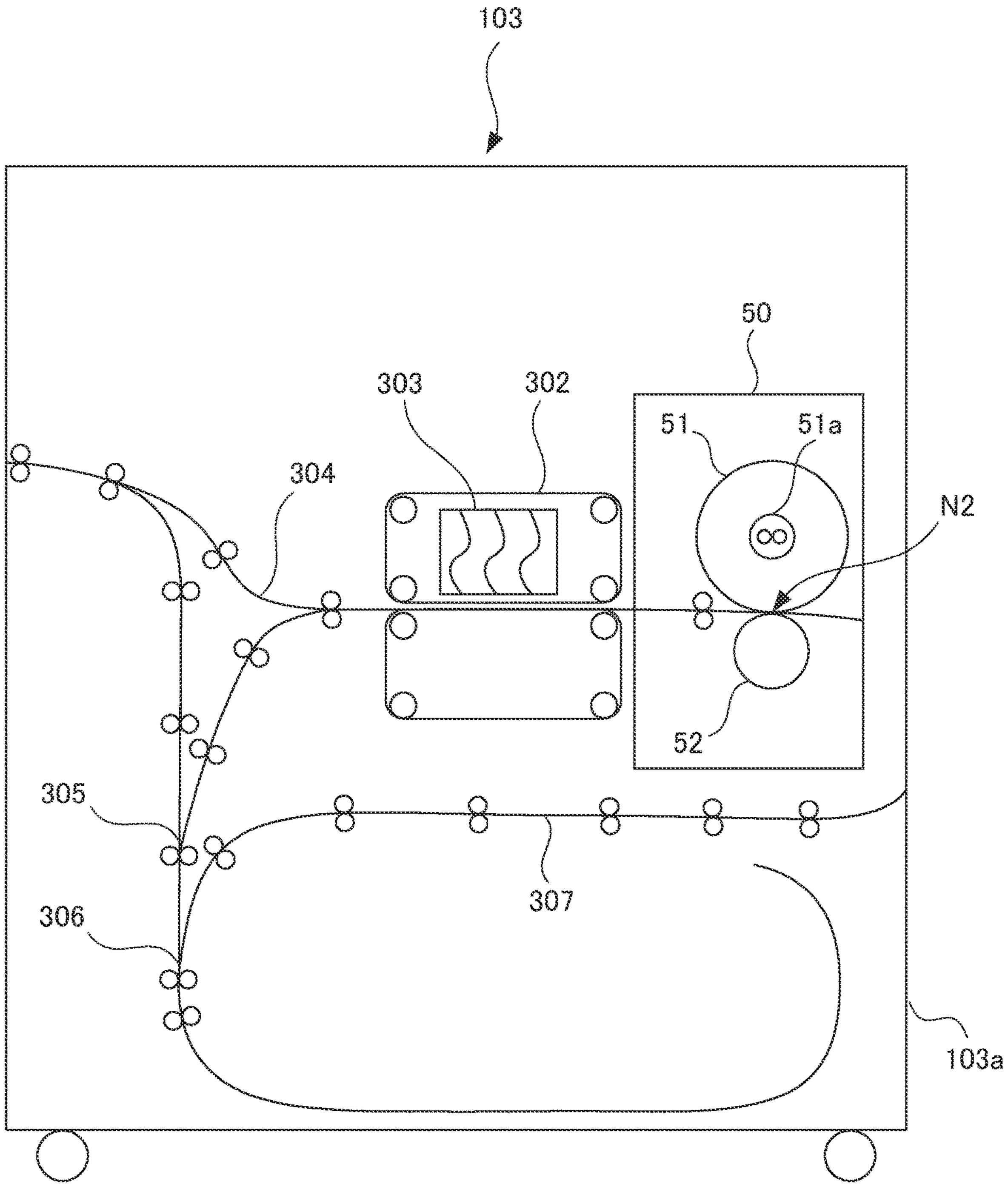
FIG. 4 is a schematic cross-sectional view of a fixing and conveying unit according to the first embodiment.

FIG. 4 is a schematic cross-sectional view of the fixing and conveying unit 103 of the image forming apparatus body 101 according to the present embodiment. A fixing unit, i.e., fixing device, 50 illustrated in FIG. 4 includes a heating roller 51 serving as a first rotary member equipped with a heater 51$a$ serving as a heating source arranged in an interior thereof, and a counter roller 52 arranged in a manner capable of abutting against the heating roller 51 and serving as a second rotary member that forms a fixing nip portion N2 for nipping and conveying the sheet with the heating roller 51. The fixing unit 50 heats and presses the toner image on the sheet S conveyed from the image forming unit 102 to the fixing nip portion N2 to thereby fix the toner image on the sheet S. The sheet S heated by the fixing unit 50 is cooled through heat absorption by a heat sink 303 arranged in an interior of a cooler 302, and conveyed through a sheet discharge conveyance path 304 to be discharged to the sensing apparatus 107 described above or a sheet processing apparatus not shown.

When the sheet S is to be reversed before discharge, the sheet S is switched back and conveyed at a sheet reverse portion 306, and the sheet S having its leading and trailing edges switched and its upper and lower surfaces reversed is passed through a reverse conveyance path 305 and the sheet discharge conveyance path 304 before being discharged.

When forming images on both sides of the sheet S, the sheet S having an image formed on a first side is switched back and conveyed at the sheet reverse portion 306, and the sheet S having its leading and trailing edges switched and its upper and lower surfaces reversed is conveyed to a duplex conveyance path 307. Thereafter, the sheet S is conveyed again to the registration roller 213 at a matched timing with a subsequent sheet S fed from the storage portion 212 inside the image forming unit 102 or a subsequent sheet S fed from one of the sheet feeding apparatuses connected to the exterior described above, and image forming is performed to a second side of the sheet S via a similar process as the first side, before the sheet S is discharged through the sheet discharge conveyance path 304.

The image forming apparatus body 101 according to the present embodiment can perform a black-and-white image formation using only the image forming station 200K for K, in addition to a full-color image formation using all image forming stations 200Y, 200M, 200C, and 200K of Y, M, C, and K mentioned above.

When forming a black-and-white image, the primary transfer rollers 207Y, 207M, and 207C, a primary transfer auxiliary roller 218, and the intermediate transfer belt 208 are displaced to a position illustrated by a broken line of FIG. 2 by a separation mechanism not shown. According to this mechanism, the image forming stations 200Y, 200M, and 200C of Y, M, and C that have been separated from the intermediate transfer belt 208 stop rotating. In other words, unnecessary wear of components caused by unnecessary rotation can be prevented in the image forming stations 200Y, 200M, and 200C corresponding to Y, M, and C, by which the stations can have an elongated service life.

Meanwhile, the photosensitive drum 201K for K has a large diameter that is suitable for realizing a longer service life compared to the photosensitive drums 201Y, 201M, and 201C for Y, M, and C. Further, the primary charger 202K for K adopts a noncontact system using a corona charger that has a longer life than roller chargers adopting a contact system of the primary chargers 202Y, 202M, and 202C for Y, M, and C. Furthermore, a toner bottle 205K for K has a greater capacity that is suitable for realizing a longer service life compared to toner bottles 205Y, 205M, and 205C for Y, M, and C.

Based on the above configuration, even in the case of a user that often uses the apparatus to form black-and-white images, the maintenance interval of the image forming station 200K for K with a higher frequency of use can be prevented from being shortened than that of the image forming stations 200Y, 200M, and 200C of Y, M, and C having a lower frequency of use. Moreover, the configuration including a large-diameter drum adopting a corona charger has a wider charge width and is suitable for high-speed image formation compared to the configuration with a small-diameter drum adopting a roller charger, such that the productivity for forming black-and-white images can be improved.

According to such image forming unit 102 in which the image forming stations 200Y to 200K have different conditions, there may be a case in which the toner charge amounts of the respective photosensitive drums 201Y to 201K differ due to the different shapes or level of wear. When there is a difference in the toner charge amounts, the transfer of toner images to the sheet S cannot be performed uniformly during a secondary transfer process, and image failures may occur. Therefore, a pre-transfer charger 220 composed of a corona charger for making the toner charge amount uniform with the photosensitive drums 201Y, 201M, and 201C for Y, M, and C is arranged on the photosensitive drum 201K for K.

As described above, according to the configuration of the present embodiment, the image forming apparatus body 101 having superior productivity, image quality, stability, and long service life can be provided not only for forming full-color images but also for forming black-and-white images.

Pre-Fixing Conveyance Unit

Figure 5:
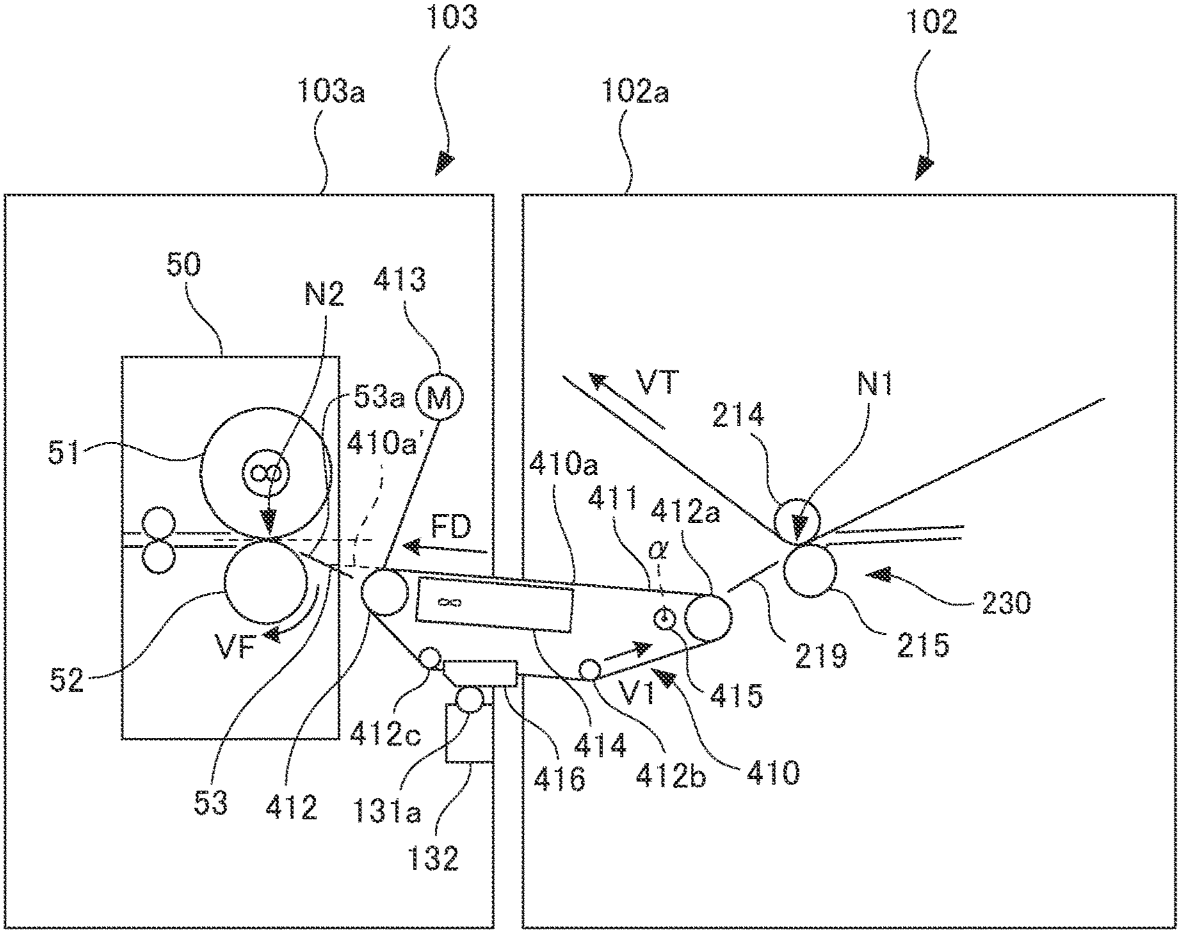
FIG. 5 is a schematic cross-sectional view illustrating a portion of the image forming apparatus body from a secondary transfer unit of the image forming unit to a fixing unit of the fixing and conveying unit according to the first embodiment.

Next, a detailed configuration of the pre-fixing conveyance unit 410 serving as a suction belt conveyance unit and a peripheral structure thereof will be described with reference to FIG. 5. FIG. 5 is a cross-sectional view illustrating the secondary transfer unit 230, the pre-fixing conveyance unit 410, and the fixing unit 50. There are growing demands for an apparatus that enables to realize high image quality, high productivity, and high image position accuracy. In order to achieve a high image quality, it is important that the posture of the sheets after transfer is constant and that the posture of the sheets before image fixing is constant. Further, in order to maintain a uniform glossiness, it is important that a proper amount of heat is stably supplied to the sheets. Further, in order to achieve a high image position accuracy, it is important that the sheets are conveyed without skewing, turning, or tilting. However, in the case of a compact image forming apparatus in which the distance between the transfer unit and the fixing unit is short, the sheet is simultaneously nipped and conveyed by the transfer unit and the fixing unit.

Meanwhile, since the transfer unit is used to transfer the toner image to the sheet, it is difficult to adjust the conveyance speed of the sheet in a delicate manner. Further, in the fixing unit, the outer diameter of the roller is expanded by the influence of heat, and it is difficult to make the conveyance speed of the sheet constant. Therefore, when a sheet is conveyed simultaneously by the transfer unit and the fixing unit, there is a problem that image failures may occur by the pulling or pushing of the sheet or by the sheet being turned during conveyance, causing the formed image to tilt. Therefore, according to the present embodiment, the pre-fixing conveyance unit 410 is provided between the secondary transfer unit 230 and the fixing unit 50, by which the distance between the secondary transfer unit 230 and the fixing unit 50 is elongated so that the above-mentioned problem is avoided.

A transfer guide 219 for guiding the sheet conveyed from the secondary transfer nip portion N1 toward the pre-fixing conveyance unit 410 is provided between the pre-fixing conveyance unit 410 and the secondary transfer nip portion N1 in a sheet conveyance direction FD. Further, a fixing inlet guide 53 serving as a pre-fixing guide for guiding the sheet conveyed by the pre-fixing conveyance unit 410 to the fixing nip portion N2 is provided between the pre-fixing conveyance unit 410 and the fixing nip portion N2 in the sheet conveyance direction FD.

As illustrated in FIG. 5, the pre-fixing conveyance unit 410 is arranged at a position lower than the secondary transfer nip portion N1 and the fixing nip portion N2. According to this configuration, the leading edge of the sheet having passed through the secondary transfer nip portion N1 is conveyed along the transfer guide 219 toward the pre-fixing conveyance unit 410. The pre-fixing conveyance unit 410 conveys the sheet along a sheet conveyance surface 410*a* toward the fixing unit 50. The fixing inlet guide 53 includes a guide surface 53*a* that guides the leading edge of the sheet having been conveyed on the sheet conveyance surface 410*a* toward the fixing nip portion N2. The guide surface 53*a* of the fixing inlet guide 53 intersects a virtual line 410*a*' having extended the sheet conveyance surface 410*a* toward the guide surface 53*a* at a position downstream of the pre-fixing conveyance unit 410 and upstream of the fixing nip portion N2 in the sheet conveyance direction FD. According to this configuration, the leading edge of the sheet conveyed from the pre-fixing conveyance unit 410 to the fixing unit 50 abuts against the fixing inlet guide 53 and the posture of the sheet is aligned along the fixing inlet guide 53, such that the sheet is appropriately introduced to the fixing nip portion N2. Thereby, it becomes possible to avoid the occurrence of image defects caused by unfixed toner on the sheet being in contact with the heating roller 51 or the occurrence of conveyance failure such as creases and corner folds.

The pre-fixing conveyance unit 410 includes a conveyor belt 411 serving as a belt portion, and a driving roller 412 and driven rollers 412*a*, 412*b*, and 412*c* that serve as tensioning members that support the conveyor belt 411 in a rotatable manner. Further, the pre-fixing conveyance unit 410 includes a drive motor 413 serving as a drive unit that drives the driving roller 412 to move the conveyor belt 411 in rotational movement. The conveyor belt 411 is an endless belt member having a large number of holes formed thereon and having air-permeability such that air can be communicated between the inner and outer sides of a peripheral surface of the conveyor belt 411. Further, a suction fan 414 serving as a suction portion for sucking the sheet onto a peripheral surface of the conveyor belt 411 is arranged on an inner side of the peripheral surface of the conveyor belt 411. The suction fan 414 can apply a suction force for conveying the sheet on the peripheral surface of the conveyor belt 411 by sucking air from the outer side to the inner side of the peripheral surface of the conveyor belt 411 through the large number of holes formed on the conveyor belt 411. Thereby, the pre-fixing conveyance unit 410 can suck the sheet onto the conveyor belt 411 by the suction fan 414 and drive the conveyor belt 411 to rotate by the drive motor 413 to thereby convey the sheet.

If the configuration having the pre-fixing conveyance unit 410 arranged between the secondary transfer unit 230 and the fixing unit 50 is disposed in one casing, the apparatus will be increased in size, such that the workability of shipping and installation of the apparatus is deteriorated. Therefore, according to the present embodiment, the secondary transfer unit 230 and the pre-fixing conveyance unit 410 are supported on a first casing 102*a* serving as the casing of the image forming unit 102, and the fixing unit 50 is supported on a second casing 103*a* serving as a casing of the fixing and conveying unit 103. The image forming apparatus body 101 is configured by connecting the image forming unit 102 to the fixing and conveying unit 103 during installation of the apparatus. That is, the image forming apparatus body 101 is divided into a plurality of modules to thereby improve the workability of shipping and installation of the apparatus.

A configuration for transferring the toner image to the sheet S prior to fixing the toner image to the sheet, including the respective image forming stations 200Y, 200M, 200C, and 200K, the intermediate transfer belt 208, the storage portion 212 of the sheets S, and the pre-fixing conveyance unit 410 is arranged in the first casing 102*a*, as illustrated in FIG. 2. A configuration for fixing the toner image to the sheet and discharging the sheet, including the fixing unit 50, the cooler 302, and the sheet discharge conveyance path 304 is arranged in the second casing 103*a*, as illustrated in FIG. 4. By connecting the first casing 102*a* to the second casing 103*a*, the sheet can be conveyed from the pre-fixing conveyance unit 410 supported on the first casing 102*a* to the fixing unit 50 supported on the second casing 103*a*.

As described, in a case where the image forming apparatus body 101 is divided into a plurality of modules, many components exist between the pre-fixing conveyance unit 410 supported on the first casing 102*a* and the fixing inlet guide 53 equipped in the fixing unit 50 supported on the second casing 103*a*, such that dimensional tolerance is increased. That is, the respective tolerances of a supporting configuration of the pre-fixing conveyance unit 410 on the first casing 102*a*, a connecting configuration of the first casing 102*a* and the second casing 103*a*, and a supporting configuration of the fixing unit 50 on the second casing 103*a* exist between the pre-fixing conveyance unit 410 and the fixing inlet guide 53 of the fixing unit 50.

By having such tolerances build up, the following sheet conveyance failures or image defects may occur. For example, if the pre-fixing conveyance unit 410 is positioned excessively low in a height direction with respect to the fixing inlet guide 53, the leading edge of the sheet may be conveyed beneath the fixing inlet guide 53 through the space between the fixing inlet guide 53 and the pre-fixing conveyance unit 410 without being abutted against the fixing inlet guide 53, and sheet jamming may occur. In contrast, if the pre-fixing conveyance unit 410 is positioned excessively high in the height direction with respect to the fixing inlet guide 53, the leading edge of the sheet will be introduced to the fixing nip portion N2 without being abutted against the fixing inlet guide 53, and image defects caused by unfixed toner on the sheet coming into contact with the heating roller 51 or conveyance failures such as creases and corner folds may occur.

Therefore, according to the present embodiment, the pre-fixing conveyance unit 410 is supported swingably on the first casing 102*a* and a portion of the pre-fixing conveyance unit 410 is abutted against a positioning member 131*a* provided in the second casing 103*a*, by which the positioning of the pre-fixing conveyance unit 410 is performed. Hereafter, this configuration will be described with reference to FIGS. 5 to 8.

Positioning Configuration of Pre-Fixing Conveyance Unit

Figure 6:
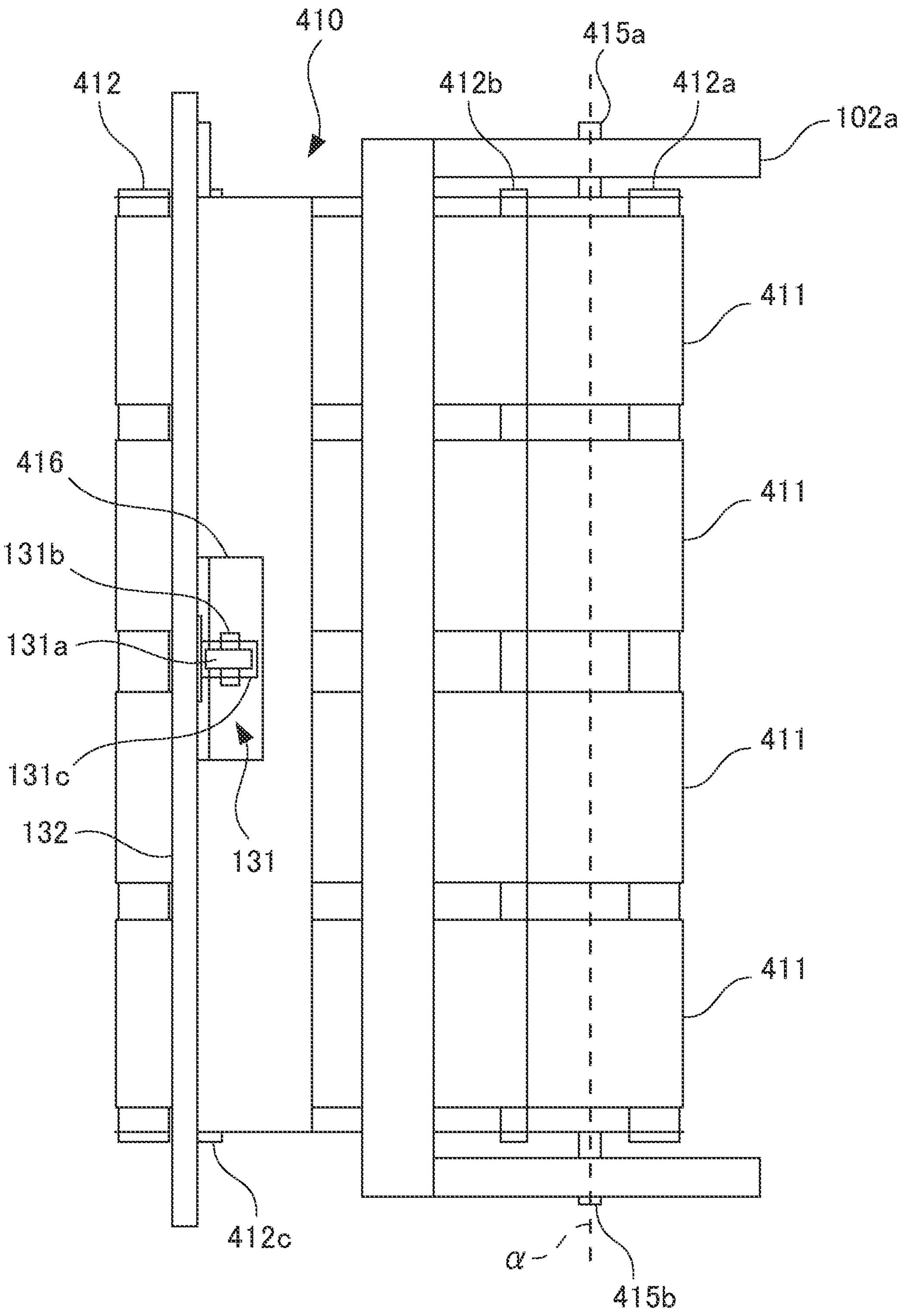
FIG. 6 is a schematic plan view illustrating a pre-fixing conveyance unit according to the first embodiment from below.
Figure 7:
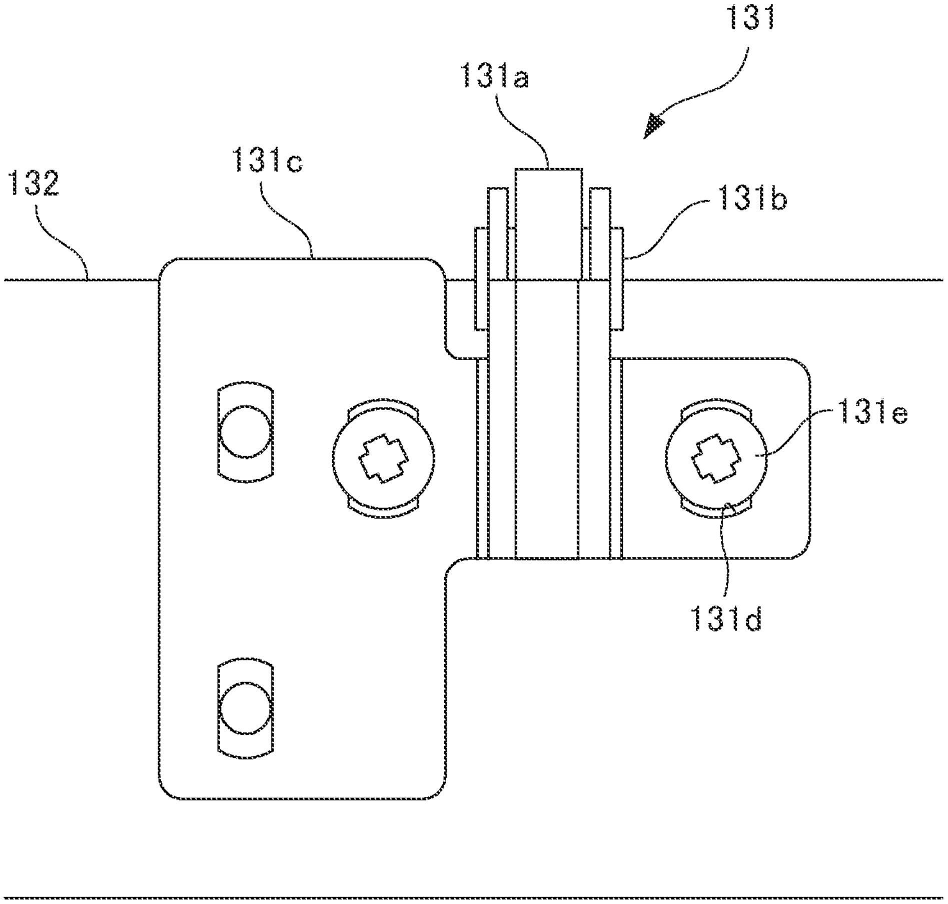
FIG. 7 is a schematic cross-sectional view illustrating a positioning portion according to the first embodiment from a conveyance direction.

With reference to FIGS. 5 to 7, a configuration for appropriately positioning the swingable pre-fixing conveyance unit 410 when connecting the image forming unit 102 and the fixing and conveying unit 103 will be described. FIG. 6 is a cross-sectional view illustrating the first casing 102*a* of the image forming unit 102, a positioning portion 131 fixed to the fixing and conveying unit 103, and the pre-fixing conveyance unit 410 in a view looking upward from a lower side of the image forming apparatus body 101. FIG. 7 is a view illustrating the positioning portion 131 having the positioning member 131*a* from the conveyance direction. The second casing 103*a* supporting the fixing unit 50 is configured to be connected to the first casing 102*a* in such a manner that a portion of the pre-fixing conveyance unit 410 enters the inner side of the second casing 103*a*, according to which the sheets are conveyed from the pre-fixing conveyance unit 410 to the fixing unit 50.

The pre-fixing conveyance unit 410 is supported swingably by a swing supporting portion 415 serving as a first positioning portion to swing with respect to the first casing 102*a* about a swing shaft α, that is, center axis of a first swing support member 415*a* and a second swing support member 415*b*, that is aligned along a sheet width direction, i.e., up-down direction of FIG. 6, that intersects, orthogonally according to the present embodiment, the sheet conveyance direction FD. Thereby, positioning of the pre-fixing conveyance unit 410 in both a vertical direction and a horizontal direction is performed by the swing supporting portion 415 provided in the first casing 102*a*. The vertical direction referred to as a predetermined direction is a direction along a surface perpendicular to a width direction of the sheet orthogonal to the sheet conveyance direction FD. The swing supporting portion 415 includes the first swing support member 415*a* serving as a first support member and the second swing support member 415*b* serving as a second support member which are capable of supporting the pre-fixing conveyance unit 410 swingably at both sides in the sheet width direction of the pre-fixing conveyance unit 410. The center axes of the first swing support member 415*a* and the second swing support member 415*b* are present on a same straight line parallel to the sheet width direction. Further, the pre-fixing conveyance unit 410 includes an abutting portion 416, at least a part of which enters the second casing 103*a* in a state where the first casing 102*a* and the second casing 103*a* are connected.

Meanwhile, the second casing 103*a* includes the positioning portion 131 serving as a second positioning portion including the abutting portion 416 and a positioning member 131*a* serving as an abutted portion. The positioning member 131*a* performs positioning of the pre-fixing conveyance unit 410 in a swinging direction about the swing shaft α by being abutted against the abutting portion 416 disposed at a portion of the pre-fixing conveyance unit 410. That is, positioning of the pre-fixing conveyance unit 410 in the vertical direction is performed by the positioning portion 131 disposed in the second casing 103*a*. According to the present embodiment, the positioning member 131*a* is disposed below the pre-fixing conveyance unit 410, and abuts against the abutting portion 416 from below to thereby support a portion of the pre-fixing conveyance unit 410. Thereby, the pre-fixing conveyance unit 410 is supported on a total of three points, two swing supports by the first swing support member 415*a* and the second swing support member 415*b* and one support by abutment of the abutting portion 416 and the positioning member 131*a*.

It is also possible to urge the pre-fixing conveyance unit 410 by a spring, for example, such that a downstream side thereof in the sheet conveyance direction FD is urged upward about the swing shaft α, and to regulate the upward swinging motion by a positioning member, to thereby perform positioning of the pre-fixing conveyance unit 410.

A positioning configuration of the pre-fixing conveyance unit 410 according to the present embodiment will be described in further detail. In the pre-fixing conveyance unit 410, the first swing support member 415*a* and the second swing support member 415*b* serving as swing shafts are arranged, one on a front side and one on a rear side in the sheet width direction orthogonal to the sheet conveyance direction FD, at a position upstream in the sheet conveyance direction FD. The front side and the rear side in the sheet width direction correspond to the front side and the rear side of the image forming apparatus body 101. The front side of the image forming apparatus body 101 is a side from which the user operates the apparatus, and for example, an operation panel for operating the image forming apparatus 100 is arranged. Similarly, the rear side is a back side of the image forming apparatus body 101.

The first swing support member 415*a* and the second swing support member 415*b* are supported swingably on the first casing 102*a*. In the present embodiment, the first swing support member 415*a* and the second swing support member 415*b* are shaft shaped, which are swingably supported by forming the members provided on the first casing 102*a* as holes. However, the swing supporting configuration of the pre-fixing conveyance unit 410 is not limited thereto, and for example, hole shapes can be provided on the pre-fixing conveyance unit 410, and the first swing support member 415*a* and the second swing support member 415*b* which are shaft-shaped members can be arranged to protrude from the first casing 102*a*.

Further, the pre-fixing conveyance unit 410 includes the abutting portion 416 serving as swing regulation member downstream in the sheet conveyance direction FD and at approximately a center area of the pre-fixing conveyance unit 410 in the sheet width direction. The abutting portion 416 abuts against the positioning member 131*a* as described above to regulate swinging of the pre-fixing conveyance unit 410. As described, the pre-fixing conveyance unit 410 is supported on a total of three points, two swing support members 415*a* and 415*b* and one abutting portion 416. As described, such three-point support realizes an effect of suppressing twist of the pre-fixing conveyance unit 410 within the unit and suppressing biasing of the conveyor belt 411 in the pre-fixing conveyance unit 410. From the viewpoint of biasing of the belt, it is preferable that the abutting portion 416 is a single point, but the arrangement is not limited thereto, and multiple abutting portions 416 can be arranged in the sheet width direction.

As illustrated in FIG. 5, the positioning member 131*a* is attached in phase with the abutting portion 416 in the sheet width direction to a fixing and conveying unit stay 132 disposed on a surface that comes into contact with the first casing 102*a* of the second casing 103*a*. As illustrated in FIG. 7, the positioning portion 131 includes the positioning member 131*a*, a shaft 131*b* that rotatably supports the positioning member 131*a*, and a support member 131*c* that supports the shaft 131*b*. The shaft 131*b* is a rotary shaft that is arranged along the sheet width direction, and the positioning member 131*a* is a driven roller that is rotatable about the rotary shaft. In addition to a rotatable roller, the positioning member 131*a* can adopt any configuration, such as a cylindrical member or a semi-cylindrical member having a smooth surface that allows easy sliding motion, as long as it has small sliding friction with the abutting portion 416 of the pre-fixing conveyance unit 410 when the first casing 102*a* and the second casing 103*a* are connected as described below.

The positioning member 131*a* described above is arranged such that a position thereof in an up-down direction, i.e., height direction, is adjustable with respect to the second casing 103*a*. Specifically, the support member 131*c* is provided with an adjustment margin such that the position of the positioning member 131a can be adjusted in the height direction. That is, the support member 131c is attached to the fixing and conveying unit stay 132 by a bolt 131e through a long hole 131d that is longitudinal in the up-down direction. Therefore, by changing the fixing position of the bolt 131e on the long hole 131d, the position of the positioning member 131a supported on the support member 131c through the shaft 131b can be adjusted in the height direction.

Thereby, the positioning member 131a enables the pre-fixing conveyance unit 410 to be assembled to the second casing 103a in a state where the height position thereof on the second casing 103a is adjusted such that the pre-fixing conveyance unit 410 is at a constant height relationship with respect to the fixing inlet guide 53. Thus, dispersion of dimensional tolerance in the height direction from the abutting portion 416 to the fixing inlet guide 53 can be suppressed. The angle and width of the guide surface 53a is set such that the leading edge of the sheet abuts against the guide surface 53a of the fixing inlet guide 53 even if there is a dispersion in the angle of the sheet conveyance surface 410a due to the dispersion of tolerance in the height direction from the abutting portion 416 to the sheet conveyance surface 410a, or if there is a dispersion of sheet posture due to the curling of the leading edge of the sheet.

Figure 8:
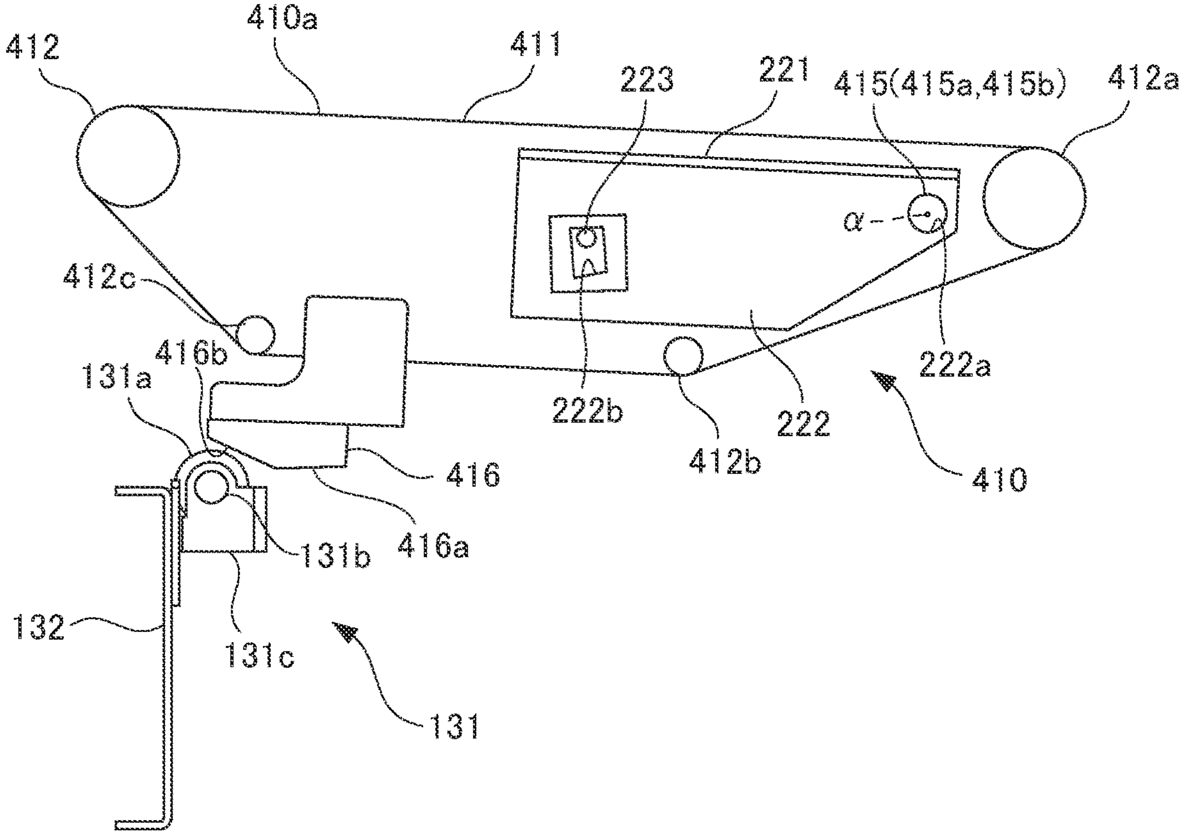
FIG. 8 is a schematic cross-sectional view illustrating a configuration of positioning the pre-fixing conveyance unit according to the first embodiment.

Next, a behavior in which the pre-fixing conveyance unit 410 is positioned when the first casing 102a and the second casing 103a are moved close to each other and connected will be described with reference to FIG. 8. FIG. 8 is a cross-sectional view illustrating a state in which swinging of the pre-fixing conveyance unit 410 is regulated by its own weight by a swing regulation portion 221. That is, the pre-fixing conveyance unit 410 includes the swing regulation portion 221 capable of regulating a swinging range about the swing shaft α in a state where the first casing 102a is not connected to the second casing 103a. The swinging range by the swing regulation portion 221 is set such that the positioning member 131a abuts against the abutting portion 416 when the first casing 102a is connected to the second casing 103a.

Specifically, the swing regulation portion 221 includes the regulation plate portion 222, and a stepped screw 223 serving as a regulation shaft portion. The regulation plate portion 222 is fixed to the first casing 102a so as to receive the weight of the pre-fixing conveyance unit 410 and regulate the swinging range of the pre-fixing conveyance unit 410. A through hole 222a serving as a hole portion to which the first swing support member 415a and the second swing support member 415b are engaged is formed on the regulation plate portion 222, and the first swing support member 415a and the second swing support member 415b are inserted to the through hole 222a. Thereby, the pre-fixing conveyance unit 410 is supported swingably on the regulation plate portion 222.

An engagement hole 222b is formed on the regulation plate portion 222 along an arc about the swing shaft α. Further, a screw hole is provided on the frame for supporting a stretching roller of the pre-fixing conveyance unit 410, wherein in a state where the first swing support member 415a and the second swing support member 415b are inserted to the through hole 222a of the regulation plate portion 222, the stepped screw 223 is inserted to the engagement hole 222b, and the stepped screw 223 is engaged to the screw hole of the pre-fixing conveyance unit 410 together with the regulation plate portion 222. Thereby, the stepped screw 223 is swingable along the arc about the swing shaft α within the engagement hole 222b, and the pre-fixing conveyance unit 410 is swingable within the engagement range of the stepped screw 223 and the engagement hole 222b. Then, when the image forming unit 102 alone is considered, the pre-fixing conveyance unit 410 is swingable within the regulation range of the swing regulation portion 221, that is, the engagement range of the stepped screw 223 and the engagement hole 222b, and a state is realized in which swinging is regulated by its own weight by the swing regulation portion 221.

According to the present embodiment, the swinging range is regulated by the stepped screw, but the configuration for regulating swing is not limited thereto, and any member capable of regulating the range of the swing can be disposed on the pre-fixing conveyance unit 410 or the first casing 102a, as long as the member can regulate the swinging range of the pre-fixing conveyance unit 410.

Meanwhile, the abutting portion 416 includes a positioning surface 416a and a guiding surface 416b. The positioning surface 416a performs positioning of the pre-fixing conveyance unit 410 by abutting against the positioning member 131a. The guiding surface 416b is disposed downstream in the sheet conveyance direction FD of the positioning surface 416a, and guides the positioning member 131a to the positioning surface 416a when connecting the first casing 102a to the second casing 103a. The abutting portion 416 has an approximately trapezoidal shape when viewed in the sheet width direction, and adopts a material having good slidability. Further, the guiding surface 416b is formed to be inclined upward toward the downstream side in the sheet conveyance direction FD.

A swing regulation position on an upper side of the swing regulation portion 221 is set so that when the first casing 102a and the second casing 103a are connected, an outer peripheral surface of the positioning member 131a and the guiding surface 416b of the abutting portion 416 abut against one another. That is, the swinging range of the pre-fixing conveyance unit 410 is regulated such that the guiding surface 416b abuts against the positioning member 131a in a state where the first casing 102a and the second casing 103a are connected while swinging of the pre-fixing conveyance unit 410 by its own weight is regulated, in other words, while the stepped screw 223 is engaged with the upper edge portion of the engagement hole 222b.

According to the present embodiment, by adopting the above-mentioned configuration, when connecting the first casing 102a and the second casing 103a, at first, the guiding surface 416b of the abutting portion 416 of the pre-fixing conveyance unit 410 entering the second casing 103a abuts against the positioning member 131a. Then, by the pre-fixing conveyance unit 410 entering further into the second casing 103a, the guiding surface 416b slides against the positioning member 131a and the pre-fixing conveyance unit 410 is pushed upward. In a state where the first casing 102a and the second casing 103a are connected, the positioning member 131a is positioned at the positioning surface 416a and the pre-fixing conveyance unit 410 is positioned in the swinging direction. In this state, the guiding surface 416b and the positioning surface 416a abut against the positioning member 131a smoothly.

Further, when connecting the first casing 102a and the second casing 103a, they may come into contact with one another in a manner deviated in the front-back direction. In order to have the outer peripheral surface of the positioning member 131a and the guiding surface 416b of the abutting portion 416 abut against one another within a presumed range of the amount of deviation, the abutting portion 416 has a constant width in the front-back direction.

By adopting the above-mentioned configuration, when connecting the first casing 102*a* and the second casing 103*a*, the pre-fixing conveyance unit 410 is designed to swing smoothly and the height of the fixing unit 50 with respect to the fixing inlet guide 53 is appropriately determined. That is, when connecting the first casing 102*a* and the second casing 103*a*, the abutting portion 416 rides over the positioning member 131*a* and regulates swinging of the pre-fixing conveyance unit 410. Thereby, the guide surface 53*a* of the fixing inlet guide 53 and the virtual line 410*a*' of the sheet conveyance surface 410*a* of the pre-fixing conveyance unit 410 come to intersect at an appropriate area.

According to the present embodiment, the positioning of the pre-fixing conveyance unit 410 with respect to the fixing unit 50 is performed by the abutment of the positioning member 131*a* disposed on the second casing 103*a* and the abutting portion 416 disposed on the pre-fixing conveyance unit 410. Therefore, the number of members present between the fixing unit and the pre-fixing conveyance unit 410 to realize positioning can be reduced, and the tolerance related to positioning can be reduced. As a result, in a configuration where the pre-fixing conveyance unit 410 and the fixing unit 50 are supported on different casings and the casings are connected together, conveyance failure of sheets and occurrence of image failures can be suppressed.

Therefore, according to the present embodiment, even in a large-scale apparatus, the apparatus can be separated into multiple modules for packing and shipping, such that the workability related to logistics leading to the installation of the apparatus are improved, and image failures caused by unfixed toner on the sheet coming into contact with the heating roller 51 or conveyance failures such as creases and corner folds of the sheets are suppressed, according to which image quality can be improved.

Second Embodiment

Figure 9:
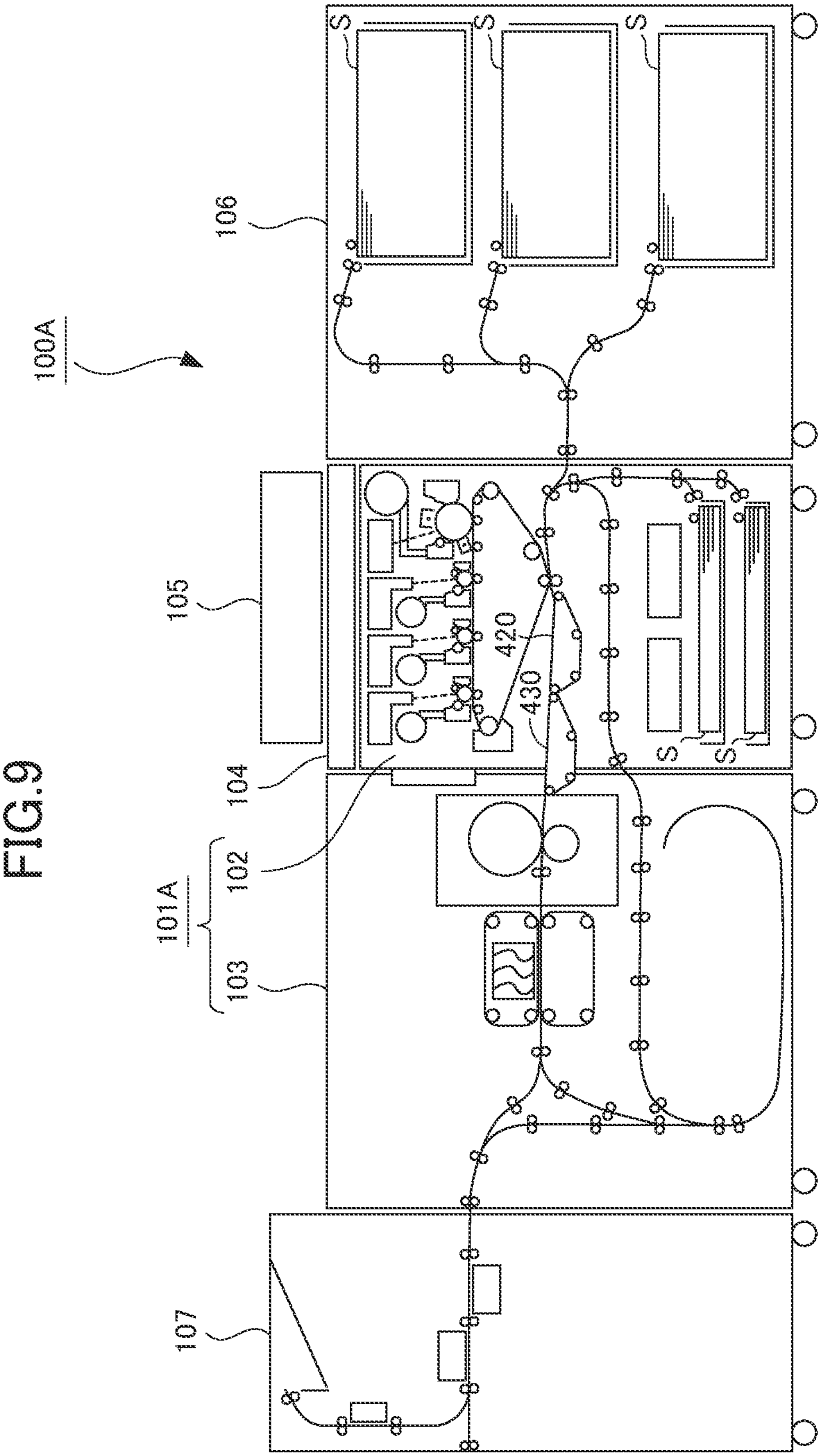
FIG. 9 is a schematic cross-sectional view of an image forming apparatus according to a second embodiment.
Figure 10:
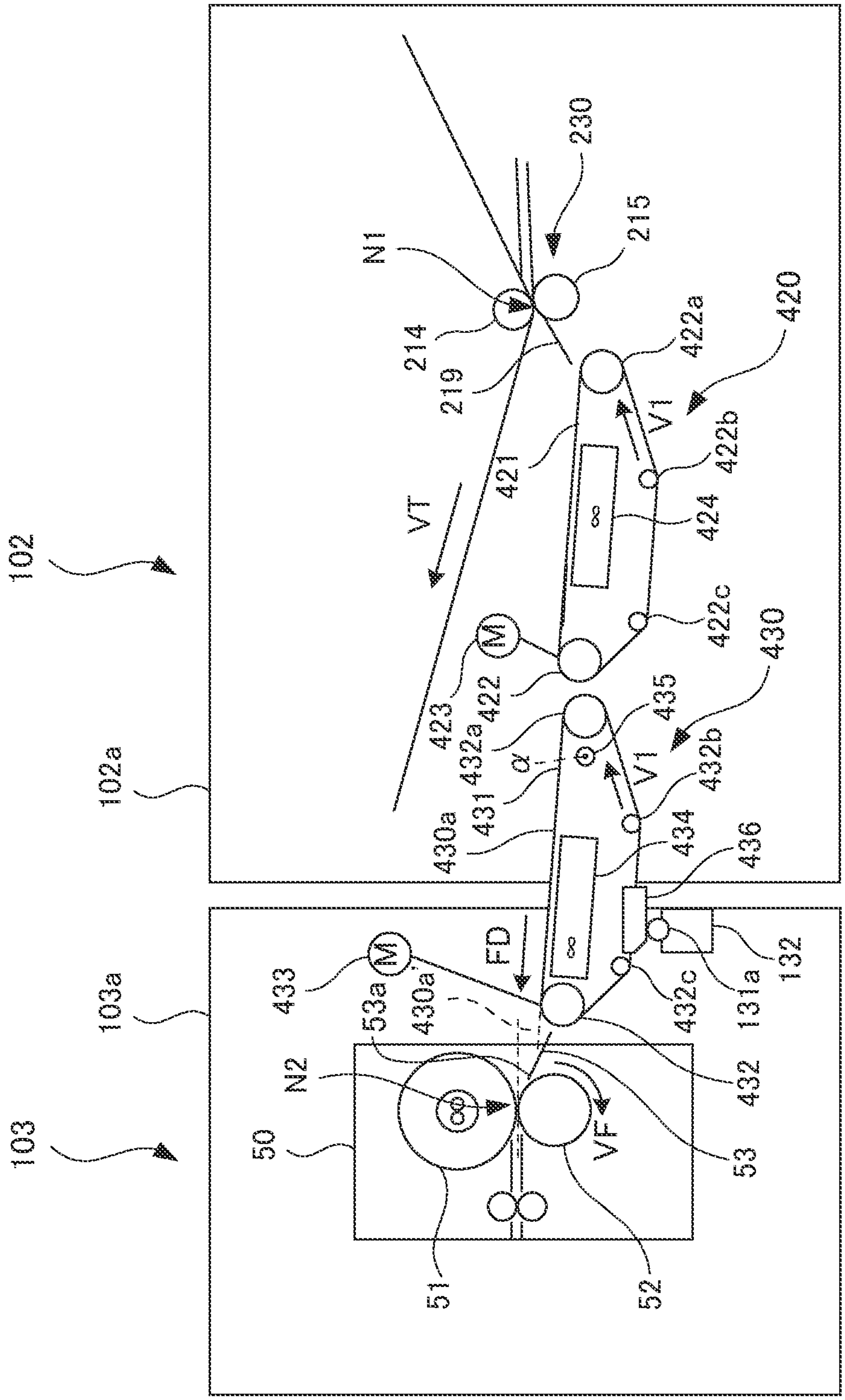
FIG. 10 is a schematic cross-sectional view illustrating a portion of the image forming apparatus body from a secondary transfer unit of the image forming unit to a fixing unit of a fixing and conveying unit according to the second embodiment.

FIGS. 9 and 10 will be described with reference to a second embodiment. In the first embodiment mentioned above, a case in which one pre-fixing conveyance unit 410 is provided in the apparatus was described. In contrast, according to the second embodiment, a plurality of pre-fixing conveyance units are arranged between the secondary transfer unit 230 and the fixing unit 50. The other configurations and effects are similar to those of the first embodiment described above, such that similar configurations are denoted with the same reference numbers and descriptions and illustrations thereof are omitted or simplified, and only the points that differ from the first embodiment will mainly be described.

At first, in a case where jamming of sheet occurs in the circumference of the pre-fixing conveyance unit, it is desirable that jam removal is performed in a state where the pre-fixing conveyance unit and the peripheral units thereof are drawn out of the apparatus to realize improved jam removal property during removal of the jammed sheet. However, when a configuration as according to the first embodiment is adopted in which a portion of the pre-fixing conveyance unit 410 in the first casing 102*a* is abutted against the positioning member 131*a* in the second casing 103*a* to realize positioning, the pre-fixing conveyance unit 410 is arranged in a state laid across both the first casing 102*a* and the second casing 103*a*. In this case, the pre-fixing conveyance unit 410 is arranged in a manner hidden behind the stay of the frame body of the first casing 102*a*, and the pre-fixing conveyance unit 410 cannot be drawn out.

Further, as described in the first embodiment, the posture of the sheet entering the fixing unit 50 is important to improve the image quality, such that the fixing unit 50 and the pre-fixing conveyance unit 410 arranged upstream thereof is required to be in a highly accurate mutual positional relationship. In other words, if it is desirable for the unit to be drawn out of the apparatus to improve the jam removal property and it is also desirable for the mutual positional relationship between the fixing unit 50 and the pre-fixing conveyance unit 410 positioned upstream thereof to be highly accurate, the pre-fixing conveyance unit is preferably configured to be divided into two or more conveyance units.

Therefore, the present embodiment is provided with a second pre-fixing conveyance unit 420 serving as a second conveyance unit in addition to a first pre-fixing conveyance unit 430 serving as a first conveyance unit corresponding to the pre-fixing conveyance unit 410 of the first embodiment. FIG. 9 is a schematic cross-sectional view of an image forming apparatus, i.e., image forming system, 100A including an image forming apparatus body 101A according to the present embodiment. FIG. 10 is a cross-sectional view illustrating the secondary transfer unit 230, the first pre-fixing conveyance unit 430, the second pre-fixing conveyance unit 420, and the fixing unit 50.

The second pre-fixing conveyance unit 420 arranged on the upstream side in the sheet conveyance direction FD and the first pre-fixing conveyance unit 430 arranged on the downstream side are provided between the secondary transfer unit 230 and the fixing unit 50 in the sheet conveyance direction FD. That is, the second pre-fixing conveyance unit 420 is arranged between the first pre-fixing conveyance unit 430 and the secondary transfer unit 230 in the sheet conveyance direction FD, and conveys the sheet to which a toner image has been transferred in the secondary transfer unit 230 toward the first pre-fixing conveyance unit 430. The second pre-fixing conveyance unit 420 is detachably attached to the first casing 102*a*. That is, the second pre-fixing conveyance unit 420 is supported on the first casing 102*a* such that it can be drawn out of the first casing 102*a* to perform jam removal. The second pre-fixing conveyance unit 420 is drawn out from the front side of the first casing 102*a* by opening the door provided on the front side of the image forming unit 102, for example, and pushed in toward the rear side to be accommodated in the first casing 102*a*.

The first pre-fixing conveyance unit 430 is supported swingably on the first casing 102*a*, and positioned in the swinging direction by the positioning member 131*a*, similar to the pre-fixing conveyance unit 410 described in the first embodiment. That is, the supporting configuration and the positioning configuration of the first pre-fixing conveyance unit 430 are similar to those of the pre-fixing conveyance unit 410 according to the first embodiment. Specifically, the first pre-fixing conveyance unit 430 is supported swingably on the first casing 102*a* about the swing shaft α along the sheet width direction that intersects, orthogonally according to the present embodiment, the sheet conveyance direction FD by a swing supporting portion 435. The configuration of the swing supporting portion 435 is similar to the swing supporting portion 415 of the first embodiment. Further, the first pre-fixing conveyance unit 430 includes an abutting portion 436, at least a portion of which enters the second casing 103*a*, in a state where the first casing 102*a* and the second casing 103*a* are connected. The configuration of the abutting portion 436 is similar to the abutting portion 416 of the first embodiment.

Meanwhile, the positioning member 131*a* is provided in the second casing 103*a*. The positioning member 131*a* abuts against the abutting portion 436 provided at a portion of the first pre-fixing conveyance unit 430 to thereby perform positioning of the first pre-fixing conveyance unit 430 in the swinging direction about the swing shaft α. The positioning member 131*a* adopts a configuration similar to the first embodiment, and it is attached in phase with the abutting portion 436 in the sheet width direction to the fixing and conveying unit stay 132 disposed on a surface that comes into contact with the first casing 102*a* of the second casing 103*a*.

The transfer guide 219 that guides the sheet conveyed from the secondary transfer nip portion N1 toward the second pre-fixing conveyance unit 420 is provided between the second pre-fixing conveyance unit 420 and the secondary transfer nip portion N1 in the sheet conveyance direction FD. Further, the fixing inlet guide 53 that guides the sheet conveyed by the first pre-fixing conveyance unit 430 to the fixing nip portion N2 is provided between the first pre-fixing conveyance unit 430 and the fixing nip portion N2 in the sheet conveyance direction FD. As shown in FIG. 10, an upstream end of the second pre-fixing conveyance unit 420 is arranged at a position lower than the secondary transfer nip portion N1 when viewed in the width direction of the sheet orthogonal to the sheet conveyance direction FD. According to this configuration, the leading edge of the sheet having passed through the secondary transfer nip portion N1 is conveyed along the transfer guide 219 toward the second pre-fixing conveyance unit 420.

The upstream end of the first pre-fixing conveyance unit 430 is arranged at a position lower than a downstream end of the second pre-fixing conveyance unit 420 to receive sheets from the second pre-fixing conveyance unit 420. According to this configuration, the leading edge of the sheet having passed through the second pre-fixing conveyance unit 420 is conveyed toward the first pre-fixing conveyance unit 430.

The first pre-fixing conveyance unit 430 conveys sheets along a sheet conveyance surface 430*a* toward the fixing unit 50. The fixing inlet guide 53 includes the guide surface 53*a* that guides the leading edge of the sheet being conveyed on the sheet conveyance surface 430*a* toward the fixing nip portion N2. The guiding surface of the fixing inlet guide 53 intersects a virtual line 430*a*' of the sheet conveyance surface 430*a* positioned downstream of the first pre-fixing conveyance unit 430 and upstream of the fixing nip portion N2 in the sheet conveyance direction FD. According to this configuration, the leading edge of the sheet being conveyed from the first pre-fixing conveyance unit 430 to the fixing unit 50 abuts against the fixing inlet guide 53 and the posture of the sheet is aligned along the fixing inlet guide 53, by which the sheet is correctly introduced to the fixing nip portion N2. Thereby, image failures that may occur by unfixed toner on the sheet coming into contact with the heating roller 51 or conveyance failures such as creases and corner folds of the sheets can be suppressed.

The second pre-fixing conveyance unit 420 includes a conveyor belt 421, and a driving roller 422 and driven rollers 422*a*, 422*b*, and 422*c* that serve as tensioning members that support the conveyor belt 421 in a rotatable manner. Further, the second pre-fixing conveyance unit 420 includes a drive motor 423 that drives the driving roller 422 to move the conveyor belt 421 in rotational movement. The conveyor belt 421 is an endless belt member having a large number of holes formed thereon and having air-permeability such that air can be communicated between the inner and outer sides of a peripheral surface of the conveyor belt 421. Further, a suction fan 424 serving as a suction portion for sucking the sheet onto a peripheral surface of the conveyor belt 421 is arranged on an inner side of the peripheral surface of the conveyor belt 421. The suction fan 424 can apply a suction force for conveying the sheet on the peripheral surface of the conveyor belt 421 by sucking air from the outer side to the inner side of the peripheral surface of the conveyor belt 421 through the large number of holes formed on the conveyor belt 421. Thereby, the second pre-fixing conveyance unit 420 can suck the sheet onto the conveyor belt 421 by the suction fan 424 and drive the conveyor belt 421 to rotate by the drive motor 423 to thereby convey the sheet.

The respective configurations equipped in the first pre-fixing conveyance unit 430 adopts a similar configuration as the pre-fixing conveyance unit 410 illustrated in the first embodiment. That is, the first pre-fixing conveyance unit 430 includes a conveyor belt 431, and a driving roller 432 and driven rollers 432*a*, 432*b*, and 432*c* that serve as tensioning members that support the conveyor belt 431 in a rotatable manner. Further, the first pre-fixing conveyance unit 430 includes a drive motor 433 that drives the driving roller 432 to rotate and move the conveyor belt 431 in rotational movement. Further, a suction fan 434 serving as a suction portion for sucking the sheet onto the peripheral surface of the conveyor belt 431 is arranged on an inner side of the peripheral surface of the conveyor belt 431. Further, the respective configurations of the fixing and conveying unit 103 and the fixing unit 50 are similar to the configurations illustrated in the first embodiment.

According to the configurations illustrated above, the present embodiment enables to improve the jam removability in addition to the effects illustrated in the first embodiment. The present embodiment has described a configuration in which two pre-fixing conveyance units are provided, but a configuration where three or more pre-fixing conveyance units are provided can also be adopted. In that case, the pre-fixing conveyance unit arranged most downstream in the sheet conveyance direction FD between the secondary transfer unit 230 and the fixing unit 50 can adopt the supporting configuration and the positioning configuration similar to the pre-fixing conveyance unit 410 of the first embodiment.

Third Embodiment

Figure 11:
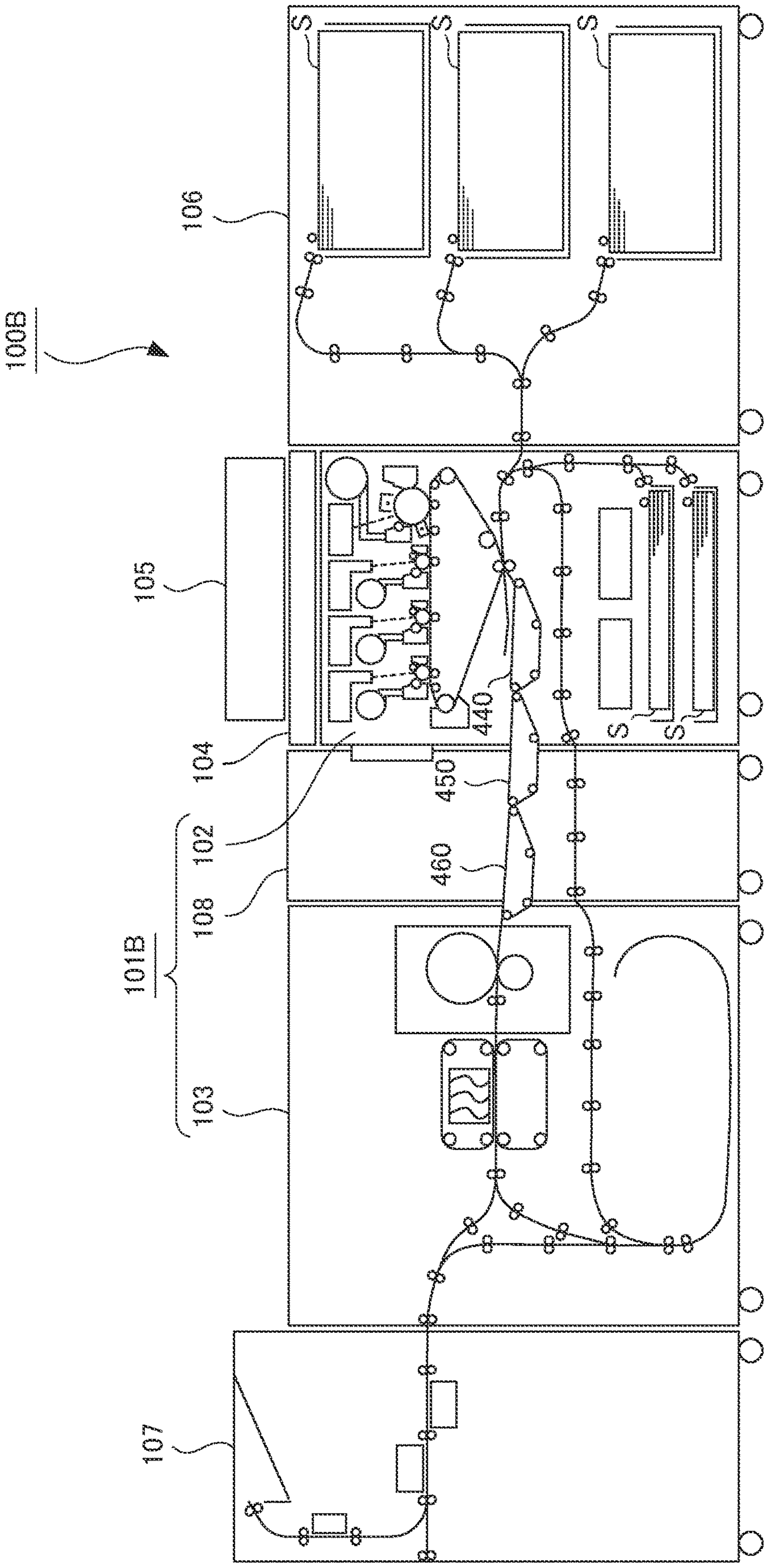
FIG. 11 is a schematic cross-sectional view of an image forming apparatus according to a third embodiment.
Figure 12:
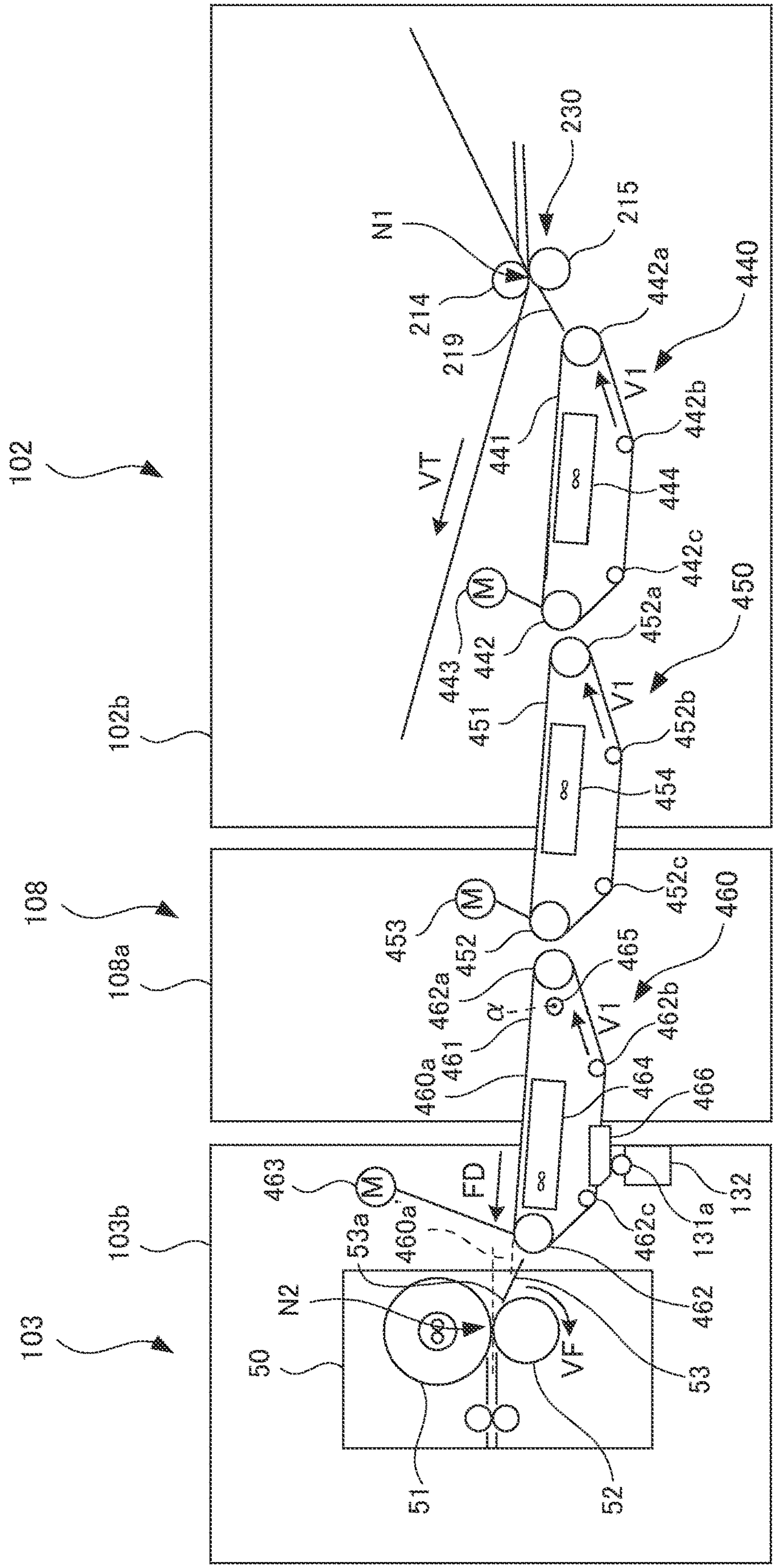
FIG. 12 is a schematic cross-sectional view illustrating a portion of the image forming apparatus body from a secondary transfer unit of the image forming unit to a fixing unit of a fixing and conveying unit according to the third embodiment.

The third embodiment will be described with reference to FIGS. 11 and 12. In the first and second embodiments described above, a configuration in which the image forming unit 102 is directly connected to the fixing and conveying unit 103 has been described. In contrast, according to the present embodiment, the image forming unit 102 and the fixing and conveying unit 103 are connected through an intermediate conveyance unit 108. The other configurations and effects are similar to those of the second embodiment described above, such that similar configurations are denoted with the same reference numbers and descriptions and illustrations thereof are omitted or simplified, and only the points that differ from the second embodiment will mainly be described below.

In general, it is preferable from the viewpoint of realizing high image quality and high productivity to ensure a distance of approximately 19.2 in., that is, 487.7 mm, referred to as a standard size, between the secondary transfer nip portion N1 and the fixing nip portion N2. Therefore, according to the second embodiment described above, a distance L1 between the secondary transfer nip portion N1 and the fixing nip portion N2 is set to approximately 500 mm, equal to or longer than 19 in., i.e., 483 mm. Therefore, even according to the configuration of the second embodiment, if the length of the sheet in the sheet conveyance direction FD is 19 in. or shorter, the sheet can be conveyed without being nipped simultaneously by both the secondary transfer nip portion N1 and the fixing nip portion N2. That is, in the case of the sheet having a 19-in. length, it becomes possible to avoid image failures since the sheet will not be nipped simultaneously by the secondary transfer nip portion N1 and the fixing nip portion N2, such that a product having a high image quality and high accuracy can be provided.

However, in the field of image forming apparatuses adopting an electrophotographic system, there are increasing demands to form images on sheets having a length in the conveyance direction of the sheet that is longer than the standard-sized sheet, so-called long sheets, in addition to the standard-sized sheets. Meanwhile, generally in the case of the so-called long sheet having a length exceeding 19 in., the sheet is nipped simultaneously by both the secondary transfer nip portion N1 and the fixing nip portion N2 according to the second embodiment. If a sheet conveyance speed at the fixing nip portion N2, i.e., fixing conveyance speed VF, is higher than the sheet conveyance speed at the secondary transfer nip portion N1, i.e., transfer conveyance speed VT, the sheet will be pulled by the fixing unit 50.

A nipping force of the fixing unit 50 nipping the sheet is designed to be greater than a nipping force of the secondary transfer unit 230 nipping the sheet so as to fix toner onto the sheet. Therefore, the sheet passing through the secondary transfer unit 230 is pulled by the fixing unit 50, by which transfer failure of the toner image borne on the intermediate transfer belt 208 may occur.

Further, the image quality may be deteriorated by unfixed toner on the sheet coming into contact with the heating roller 51 at an area upstream in the conveyance direction of the fixing nip portion N2.

If the transfer conveyance speed VT is faster than the fixing conveyance speed VF, transfer failure of the toner image borne on the intermediate transfer belt 208 may occur by bumping and returning of the sheet caused by the leading edge of the sheet bumping onto the fixing nip portion N2.

In contrast, if the distance L1 between the secondary transfer nip portion N1 and the fixing nip portion N2 is set to approximately 800 mm, which is equal to or longer than 30 in., i.e., 762 mm, which is the length of the sheet generally used as the long sheet, image failures as described above can be avoided. However, if the distance L1 is elongated as described above, the image forming unit 102 or the fixing and conveying unit 103 that constitute the image forming apparatus body 101 will become large, and the work related to shipping and installing the apparatuses will become time-consuming.

Therefore, according to the present embodiment, the intermediate conveyance unit 108, which is a separate module from the image forming unit 102 and the fixing and conveying unit 103, is arranged between the image forming unit 102 and the fixing and conveying unit 103 so as to elongate the distance L1 between the secondary transfer nip portion N1 and the fixing nip portion N2. That is, according to the present embodiment, an image forming apparatus body 101B is composed of three separate modules, which are the image forming unit 102, the intermediate conveyance unit 108, and the fixing and conveying unit 103. According further to the present embodiment, a casing 108*a* of the intermediate conveyance unit 108 corresponds to a first casing, a casing 103*b* of the fixing and conveying unit 103 corresponds to a second casing, and a casing 102*b* of the image forming unit 102 corresponds to a third casing.

Further, the present embodiment includes, in addition to a first pre-fixing conveyance unit 460 serving as a first conveyance unit corresponding to the pre-fixing conveyance unit 410 of the first embodiment, a third pre-fixing conveyance unit 450 serving as a third conveyance unit, and a second pre-fixing conveyance unit 440 serving as a second conveyance unit corresponding to the second pre-fixing conveyance unit 420 of the second embodiment. That is, the second pre-fixing conveyance unit 440, the third pre-fixing conveyance unit 450, and the first pre-fixing conveyance unit 460 are arranged in the named order from the upstream side in the sheet conveyance direction.

The configuration of the present embodiment will be described with reference to FIGS. 11 and 12. FIG. 11 is a schematic cross-sectional view of an image forming apparatus, i.e., image forming system, 100B including the image forming apparatus body 101B according to the present embodiment. Further, FIG. 12 is a cross-sectional view illustrating the secondary transfer unit 230, the second pre-fixing conveyance unit 440, the third pre-fixing conveyance unit 450, the first pre-fixing conveyance unit 460, and the fixing unit 50.

Between the secondary transfer unit 230 and the fixing unit 50 in the sheet conveyance direction FD are arranged the second pre-fixing conveyance unit 440 which is arranged most upstream in the sheet conveyance direction FD, the first pre-fixing conveyance unit 460 which is arranged most downstream thereof, and the third pre-fixing conveyance unit 450 which is arranged between the second pre-fixing conveyance unit 440 and the first pre-fixing conveyance unit 460. The second pre-fixing conveyance unit 440 is supported on the casing 102*b* serving as a third casing that can be drawn out to remove jammed sheets, similar to the second pre-fixing conveyance unit 420 disclosed in the second embodiment.

The third pre-fixing conveyance unit 450 is fixed to and supported by the casing 102*b*. That is, the casing 102*b* supports the secondary transfer unit 230, the second pre-fixing conveyance unit 440, and the third pre-fixing conveyance unit 450. The casing 102*b* is arranged upstream of the casing 108*a* in the sheet conveyance direction FD and connected to the casing 108*a* such that a portion of the third pre-fixing conveyance unit 450 enters the interior of the casing 108*a*, by which the sheets can be conveyed from the third pre-fixing conveyance unit 450 to the first pre-fixing conveyance unit 460. Further, the third pre-fixing conveyance unit 450 can be swingably supported on the casing 102*b* and positioned in the swinging direction by the positioning member provided on the casing 108*a* of the intermediate conveyance unit 108, similar to the pre-fixing conveyance unit 410 disclosed in the first embodiment.

When viewed in the width direction of the sheet orthogonal to the sheet conveyance direction FD, the upstream end of the first pre-fixing conveyance unit 460 is arranged at a lower position than a downstream end of the third pre-fixing conveyance unit 450 so as to receive sheets from the third pre-fixing conveyance unit 450. According to this configuration, the leading edge of the sheet having passed through the third pre-fixing conveyance unit 450 is conveyed toward the first pre-fixing conveyance unit 460.

The first pre-fixing conveyance unit 460 conveys sheets along a sheet conveyance surface 460*a* toward the fixing unit 50. The fixing inlet guide 53 includes the guide surface

53*a* that guides a leading edge of the sheet conveyed on the sheet conveyance surface 460*a* toward the fixing nip portion N2. The guide surface 53*a* of the fixing inlet guide 53 intersects a virtual line 460*a'* of the sheet conveyance surface 460*a* positioned downstream of the first pre-fixing conveyance unit 460 and upstream of the fixing nip portion N2 in the sheet conveyance direction FD. According to this configuration, the leading edge of the sheet being conveyed from the first pre-fixing conveyance unit 460 to the fixing unit 50 abuts against the fixing inlet guide 53 and the posture of the sheet is aligned along the fixing inlet guide 53, by which the sheet is introduced correctly to the fixing nip portion N2. Thereby, image failures that may occur by unfixed toner on the sheet coming into contact with the heating roller 51 or conveyance failures such as creases and corner folds of the sheets can be avoided.

The respective configurations of the second pre-fixing conveyance unit 440 and the third pre-fixing conveyance unit 450 are similar to the configuration of the second pre-fixing conveyance unit 420 described in the second embodiment. Further, the configurations of the first pre-fixing conveyance unit 460 are similar to the configuration of the pre-fixing conveyance unit 410 described in the first embodiment.

That is, the second pre-fixing conveyance unit 440, the third pre-fixing conveyance unit 450, and the first pre-fixing conveyance unit 460 respectively include conveyor belts 441, 451, and 461, and driving rollers 442, 452, and 462 and driven rollers 442*a*, 452*a*, 462*a*, 442*b*, 452*b*, 462*b*, 442*c*, 452*c*, and 462*c* that serve as tensioning members that support the conveyor belts 441, 451, and 461 in a rotatable manner. Further, the second pre-fixing conveyance unit 440, the third pre-fixing conveyance unit 450, and the first pre-fixing conveyance unit 460 respectively include drive motors 443, 453, and 463 that drive the driving rollers 442, 452, and 462 to rotate and move the conveyor belts 441, 451, and 461 in rotational movement. Suction fans 444, 454, and 464 serving as a suction portion for sucking the sheet onto a peripheral surface of the conveyor belts 441, 451, and 461 are respectively arranged on an inner side of the peripheral surface of the conveyor belts 441, 451, and 461.

The first pre-fixing conveyance unit 460 is supported swingably on the casing 108*a* of the intermediate conveyance unit 108. The respective configurations of the first pre-fixing conveyance unit 460 are similar to the configurations of the pre-fixing conveyance unit 410 described in the first embodiment. However, unlike the first embodiment, according to the present embodiment, the first pre-fixing conveyance unit 460 is supported on the casing 108*a* of the intermediate conveyance unit 108.

That is, the first pre-fixing conveyance unit 460 is supported swingably on the casing 108*a* about the swing shaft α along the sheet width direction intersecting, orthogonally according to the present embodiment, the sheet conveyance direction FD by a swing supporting portion 465. The configuration of the swing supporting portion 465 is similar to the swing supporting portion 415 of the first embodiment. Further, the first pre-fixing conveyance unit 460 includes an abutting portion 466, at least a portion of which enters the casing 103*b*, in a state where the casing 108*a* and the casing 103*b* are connected. The configuration of the abutting portion 466 is similar to the abutting portion 416 of the first embodiment.

The positioning member 131*a* is provided on the casing 103*b*. The positioning member 131*a* performs positioning of the first pre-fixing conveyance unit 460 in the swinging direction about the swing shaft α by abutting against the abutting portion 466 provided at a portion of the first pre-fixing conveyance unit 460. The positioning member 131*a* adopts a similar configuration as the first embodiment, and it is attached in phase with the abutting portion 466 in the sheet width direction to the fixing and conveying unit stay 132 disposed on a surface that comes into contact with the first casing 108*a* of the casing 103*b*.

Further, the configurations of the fixing and conveying unit 103 and the fixing unit 50 are also similar to the configurations illustrated in the first embodiment. The fixing inlet guide 53 is designed in such a manner that the angle and width of the guide surface 53*a* of the fixing inlet guide 53 are set to allow the leading edge of the sheet to abut against the guiding surface of the fixing inlet guide 53 reliably, even if there is a dispersion in the angle of the sheet conveyance surface 430*a* due to the dispersion of tolerance in the height direction from the abutting portion 466 to the sheet conveyance surface 460*a* of the first pre-fixing conveyance unit 460 or a dispersion in the posture of the sheet by curling of the leading edge of the sheet to the upper or lower direction.

The behavior in which the first pre-fixing conveyance unit 460 is positioned when moving the casing 108*a* and the casing 103*b* toward each other and connecting them is similar to the configuration illustrated in the first embodiment. However, the present embodiment differs from the first embodiment in that the swing regulation member is fixed to and supported by the casing 108*a*. According to the above-described configuration, when connecting the casing 108*a* and the casing 103*b*, the first pre-fixing conveyance unit 460 swings smoothly to the determined height, and the guide surface 53*a* of the fixing inlet guide 53 and the virtual line 460*a'* of the sheet conveyance surface 460*a* of the first pre-fixing conveyance unit 460 are set to intersect at an appropriate position.

As described, in addition to the effects described in the second embodiment, the present embodiment enables to improve the image quality even in a 30-in., i.e., 762 mm, sheet that is often used as the long sheet. That is, the intermediate conveyance unit 108 is additionally provided between the secondary transfer nip portion N1 and the fixing nip portion N2 to have the sheet conveyed through the third pre-fixing conveyance unit 450. Thereby, sufficient distance can be ensured between the secondary transfer nip portion N1 and the fixing nip portion N2, and even when conveying a long sheet, image failures caused by the sheet being nipped simultaneously by both the secondary transfer nip portion N1 and the fixing nip portion N2 can be suppressed.

According to the present embodiment, the distance between the secondary transfer nip portion N1 and the fixing nip portion N2 is set to approximately 800 mm, but if an even longer sheet is to be used, another intermediate conveyance unit can be additionally provided between the secondary transfer nip portion N1 and the fixing nip portion N2 to thereby increase the number of pre-fixing conveyance units arranged between the secondary transfer nip portion N1 and the fixing nip portion N2. In that case, the pre-fixing conveyance unit arranged most downstream between the secondary transfer unit 230 and the fixing unit 50 in the sheet conveyance direction FD adopts the supporting configuration and the positioning configuration, similar to the pre-fixing conveyance unit 410 of the first embodiment.

The configuration of the present embodiment can be applied to the configuration of the first embodiment. That is, the above-mentioned intermediate conveyance unit 108 can be added between the image forming unit 102 and the fixing and conveying unit 103. In other words, according to the configuration illustrated in FIGS. 11 and 12 described above, it may be possible to adopt a configuration in which the second pre-fixing conveyance unit 440 is omitted and the sheet is directly conveyed from the transfer guide 219 to the third pre-fixing conveyance unit 450.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-006822, filed Jan. 20, 2022, which is hereby incorporated by reference herein in its entirety.

What is claimed is:

1. An image forming apparatus comprising:
- a transfer unit including a transfer nip portion configured to nip and convey a sheet, the transfer unit configured to transfer a toner image to the sheet;
- a fixing unit including a fixing nip portion configured to nip and convey the sheet, the fixing unit configured to fix the toner image transferred to the sheet by the transfer unit to the sheet;
- a suction belt conveyance unit arranged between the transfer unit and the fixing unit in a sheet conveyance direction, the suction belt conveyance unit including a belt portion, and a suction portion configured to suck the sheet to the belt portion by sucking air, the suction belt conveyance unit configured to convey the sheet sucked to the belt portion toward the fixing nip portion by rotating the belt portion;
- a first casing;
- a second casing connected to the first casing and configured to support the fixing unit;
- a first positioning portion disposed in the first casing and configured to perform positioning of the suction belt conveyance unit in a predetermined direction along a surface perpendicular to a width direction of the sheet orthogonal to the sheet conveyance direction; and
- a second positioning portion disposed in the second casing and configured to perform positioning of the suction belt conveyance unit in the predetermined direction.

2. The image forming apparatus according to claim 1,
- wherein the predetermined direction is a vertical direction, and
- wherein the first positioning portion is configured to perform positioning of the suction belt conveyance unit in a horizontal direction in addition to the predetermined direction.

3. The image forming apparatus according to claim 1,
- wherein the first positioning portion includes a swing shaft disposed on the suction belt conveyance unit, and a hole portion formed on the first casing and configured to be engaged with the swing shaft, and
- wherein the second positioning portion includes an abutting portion disposed on the suction belt conveyance unit, and an abutted portion disposed on the second casing and against which the abutting portion is configured to be abutted.

4. The image forming apparatus according to claim 3,
- wherein the abutted portion is a driven roller, and
- wherein, when the second casing is connected to the first casing, the suction belt conveyance unit is configured to be guided to an inner side of the second casing by having the driven roller abut against the abutting portion of the suction belt conveyance unit and rotate, and the positioning in the predetermined direction is performed by the suction belt conveyance unit swinging about the swing shaft.

5. The image forming apparatus according to claim 3, wherein the abutting portion includes a positioning surface configured to abut against the abutted portion and perform positioning of the suction belt conveyance unit in the predetermined direction, and a guide surface configured to guide the abutted portion toward the positioning surface when the second casing is connected to the first casing.

6. The image forming apparatus according to claim 3, wherein the abutted portion is configured such that a position of the abutted portion in the predetermined direction is adjustable with respect to the second casing.

7. The image forming apparatus according to claim 1,
- further comprising a pre-fixing guide including a guide surface configured to guide the sheet being conveyed by the suction belt conveyance unit toward the fixing nip portion, and
- wherein the guide surface is configured to intersect a virtual line extending a conveyance surface of the belt portion on which the sheet is sucked and conveyed toward the guide surface.

8. The image forming apparatus according to claim 1, wherein the transfer unit is configured to be supported on the first casing.

9. The image forming apparatus according to claim 1, further comprises a second conveyance unit,
- wherein, in a case where the suction belt conveyance unit is referred to as a first conveyance unit, the second conveyance unit is arranged between the first conveyance unit and the transfer unit in the sheet conveyance direction, the second conveyance unit configured to convey the sheet on which a toner image has been transferred by the transfer unit toward the first conveyance unit.

10. The image forming apparatus according to claim 9, wherein the second conveyance unit is configured to be detachably attached to the first casing.

11. The image forming apparatus according to claim 9, further comprising:
- a third casing configured to support the transfer unit; and
- a third conveyance unit arranged between the first conveyance unit and the second conveyance unit in the sheet conveyance direction, the third conveyance unit configured to convey the sheet from the second conveyance unit toward the first conveyance unit,
- wherein the first casing is arranged between the third casing and the second casing in the sheet conveyance direction and configured to be connected to each of the third casing and the second casing.

* * * * *